Nov. 23, 1965 W. C. GEIGER, JR 3,219,350

SOUND REPRODUCING APPARATUS

Original Filed Aug. 16, 1954 6 Sheets-Sheet 1

INVENTOR.
WILLIAM C. GEIGER JR.
BY John C. Bergner
ATTORNEY

INVENTOR.
WILLIAM C. GEIGER JR.
BY John C. Bergner
ATTORNEY

Nov. 23, 1965 W. C. GEIGER, JR 3,219,350

SOUND REPRODUCING APPARATUS

Original Filed Aug. 16, 1954 6 Sheets-Sheet 3

INVENTOR.
WILLIAM C. GEIGER JR.
BY John C. Bergner
ATTORNEY

Nov. 23, 1965 W. C. GEIGER, JR 3,219,350

SOUND REPRODUCING APPARATUS

Original Filed Aug. 16, 1954 6 Sheets-Sheet 4

INVENTOR.
WILLIAM C. GEIGER JR.
BY John C. Bergner
ATTORNEY

INVENTOR.
WILLIAM C. GEIGER JR.
BY John C. Bergner
ATTORNEY

INVENTOR.
WILLIAM C. GEIGER JR.
BY John C. Bergner
ATTORNEY

United States Patent Office 3,219,350
Patented Nov. 23, 1965

3,219,350
SOUND REPRODUCING APPARATUS
William C. Geiger, Jr., 6406 N. 5th St., Philadelphia 26, Pa.
Continuation of application Ser. No. 798,298, Mar. 9, 1959, which is a continuation of application Ser. No. 450,073, Aug. 16, 1954. This application Sept. 19, 1962, Ser. No. 225,416
47 Claims. (Cl. 274—10)

This invention relates to sound reproducing apparatus, the present application being a continuation of application Serial Number 798,298 filed March 9, 1959, now abandoned, which application was a continuation of previous prior application Serial Number 450,073 filed August 16, 1954, now abandoned. More specifically, this invention is primarily concerned with sound reproducing apparatus or phonographs of the precision turntable type, designed for the playing of disk records, and embodying automatic record playing and automatic record changing means. However, this invention is not limited to precision type turntables but can be applied to turntables of almost any quality with definite advantage.

In order for an automatic record player to enable the same excellent performance and results as turntables on which records must be played "by hand," even though its essential modern, automatic and manually-operable semi-automatic, record playing functions are being performed and maintained operative; it requires the following, different, highly desirable operating characteristics, which operating characteristics provide a useful and needed forward step, as well as a new concept, in the performance of these functions:

(1) Its automatic apparatus for moving the pickup arm means in the performance of these functions is required to impose zero value of force, at all times, on the record groove, the stylus itself and the delicate stylus suspension in the sound pickup. This new concept in the performance of these functions, in itself, affords new and useful results, which are set forth hereinafter as paragraphs 1–10 under paragraphs A1.

(2) Its entire automatic apparatus, including its own control motor means, for moving the pickup arm means to perform these functions is required to be completely operable while, at all times, entirely in spaced relationship to both the turntable means and the turntable motor means. This is discussed hereinafter as paragraphs 1–3 under paragraphs B1.

(3) It requires the complete performance of these functions without disturbing apparatus noises. This is discussed hereinafter under paragraphs C1.

Prior to this invention, no automatic record player had been devised which provided, while its essential modern, automatic and manually-operable semi-automatic, record playing functions were being individually performed and were maintained operative, the same highly desirable results and useful capacities which can be provided by turntables on which records must be played by hand, such as: the capacity for using a very high quality sound pickup having an extremely high stylus compliance, i.e. too high to be recommended for use in conventional automatic record players, maximum performance, minimum stylus wear, minimum wear of the delicate sound-engravings on the record groove and the other highly desirable results and useful capacities which can be provided by turntables on which records must be played by hand. The prime object of this invention is to provide such an automatic record player which does afford these same highly desirable results and useful capacities of a "hand-operated" turntable-player so that, now, a person can obtain in an automatic record player, while its essential modern, automatic and/or manually-operable semi-automatic, record playing functions are being performed and are maintained operative: the capacity for using a very high quality sound pickup having an extremely high stylus compliance, i.e. too high to be recommended for use in conventional automatic record players, maximum performance, minimum stylus wear, minimum wear of the delicate sound-engravings on the record groove and the many other important results and useful capacities of the "hand operated" turntable-player set forth hereinafter.

Moreover, even with the further inclusion of structure for enabling automatic playing of records of different diameters, all such important capacities and results are still obtained.

Furthermore, in an automatic record player according to this specification, a person, in addition, is provided with apparatus which obtains the much longer-playing-time afforded by automatic record-changing, without imposing substantial reduction in such highly desirable results, obtained in its full automatic playing of a single record, and the person also is still provided with certain of the highly desirable useful capacities, obtained in its full automatic playing of a single record, such as aforesaid capacity for using said extremely high stylus compliance sound pickup, i.e. too high to be recommended for use in conventional automatic record players.

All of the undesirable results and limitations in the conventional automatic record players quite apparently have been accepted by a widespread belief, evidenced in the record player industry for many years, and in publications on the subject, that they are inherent and essential characteristics which all automatic record players unquestionably must possess, to obtain their required automatic performances.

The following, A, B and C, set forth objectionable operating characteristics which exist in the conventional automatic record player as heretofore constructed, because of its structural disposition. Also set forth below are the many undesirable results and limitations created by these objectionable operating characteristics:

A. Because of the structural disposition of the conventional automatic record player, it imposed the following very undesirable forces on the delicate sound-engravings on the record groove, the stylus itself, and also on the delicate stylus suspension in the sound pickup, solely, to enable its performance of essential modern, automatic and/or manually-operable semi-automatic, record playing functions:

To automatically cause the performance of essential modern automatic record playing functions after the playing of the final recorded sound, in the conventional automatic record player a lateral force required for operating the mechanism undesirably was supplied, and also exerted, by the record groove pushing against a side of the stylus. Moreover, very undesirably, the very delicate stylus suspension in the sound pickup was also utilized to transmit this lateral force, supplied by the record groove, to the mechanism, in order to operate the mechanism for obtaining essential modern automatic record playing functions.

Furthermore, even before the playing of the final recorded sound had taken place in the conventional automatic record player, this lateral force was being exerted by sound-engravings on the grooves of those records, having relatively long musical compositions, wherein the sound engravings, hence, are engraved somewhat close to the record label. Consequently, this lateral force imposed by the conventional automatic record player to cause performing of essential modern automatic record playing functions also caused excessive damaging wear on the delicate sound-engravings on such records when played thereon, and always caused excessive damaging stylus wear.

Furthermore, in order to perform essential modern functions in the conventional automatic record player as heretofore constructed, all of the operating means which was used for actually, physically moving the pickup arm means did not disengage from, but instead frictionally dragged on, the pickup arm means during the playing of a record, and hence another, relatively appreciable value of lateral force was supplied, and exerted, by sound-engravings of the record groove, the stylus itself, and by the delicate stylus suspension in the sound pickup, solely, to overcome the reactive, lateral force caused by said frictional dragging of the operating means on the pickup arm means. Thus, this reactive lateral force imposed by the conventional automatic record player, by its operating means which was used for actually, physically moving the pickup arm means, caused excessive damaging wear on all the delicate sound-engravings of all records played thereon and also caused excessive damaging stylus wear.

It is significant that these excessive, lateral forces were obviously required to be absorbed entirely by solely a single point of contact on a single side of the record groove and entirely by solely a single point of contact on a single side of the stylus. This, of course, undersirably actually doubled the pressure absorbed by both the record groove and by the stylus, and hence also considerably increased damaging stylus wear and damaging wear on the sound-engravings, over what it would be if the same value of force was absorbed, as normally absorbed for record playing, on two points of contact on the walls of the record groove and on two points of contact on the sides of the stylus.

It is, also significant that in addition to the undesirable use of the record groove, and the stylus itself, to exert a relatively high value of lateral force to provide essential modern automatic record player functions, the very delicate stylus suspension of the modern sound pickup, while being intended only for reproducing sounds from the record, when used in modern conventional automatic record players, is always required to perform a second function, that of providing essential modern automatic record player functions. The performance of this second function is very much more severe and demanding of the delicate stylus suspension in the sound pickup than is its only actually intended function of reproducing sound, because of the relatively high value of reactive, lateral force which must be inflicted on it from the mechanism of the conventional automatic record player in order to obtain essential modern functions. In fact, this relatively severe reactive, lateral force thus inflicted on the delicate stylus suspension in the sound pickup is prone to displace the stylus.

It still further follows that, conventional automatic record players are unable to perform essential modern automatic record playing functions when any sound pickup is being used on them and is tracking at the lowest value of downward, vertical stylus tracking force on the record groove at which the sound pickup normally, actually plays records in a purely manual record player.

Instead, for certain sound pickups, conventional automatic record players, in order to perform their essential modern automatic record player functions, required downward, vertical, stylus tracking force to be added on the record groove, which force is entirely in excess of the lowest value of tracking force at which these certain sound pickups normally, actually play records in purely manual record playing. This added net, vertical force must be provided in conventional automatic record players, solely, to prevent the reactive, lateral force caused for performing essential modern automatic record player functions, from pushing the stylus out of the groove of the record, and thereby defeating such automatic operation, or from thereby even defeating record playing itself. This added, excessive, downward, vertical force of the stylus on the record groove, obviously, also is in effect during the entire playing of the record and causes excessive damaging wear on all the sound-engravings of all records played on it, as well as excessive, damaging stylus wear.

Accordingly, the following are the many undesirable results and limitations in conventional automatic record players which are created by the aforesaid reactive, lateral, and/or downward, vertical, stylus forces on the record groove, which forces are imposed by their automatic apparatuses, solely, in order to obtain essential modern automatic, and/or manually-operable semi-automatic, record playing functions:

(1) Conventional automatic record players are unable to utilize a very high quality sound pickup having an extremely high stylus compliance, i.e. too high to be recommended for use in conventional automatic record players. This is because aforesaid reactive, lateral force is prone to displace the stylus of said sound pickup, because of its very flexible stylus suspension, and thus either defeats essential modern automatic performances and/or causes distortion in the reproduced sound.

Consequently, heretofore, no apparatus whatsoever had been devised which enables the benefits of this high quality sound pickup to be obtained, while providing essential modern automatic record playing functions.

(2) The aforesaid forces imposed by the automatic apparatus for moving the pickup arm means of the conventional automatic record player, cause execessive, damaging stylus wear.

(3) The aforesaid forces imposed by the automatic apparatus for moving the pickup arm means of the conventional automatic record player, cause exessive, damaging wear on the delicate sound-engravings on the record groove.

(4) The aforesaid forces imposed by the automatic apparatus for moving the pickup arm means of the conventional automatic record player, cause excessive record surface noise with the reproduced sound.

(5) Conventional automatic record players are prone to cause distortion in the reproduced sound due to the danger which must exist of the stylus, in any modern sound pickup, being displaced, unkowningly to the user, by the aforesaid reactive, lateral force.

(6) Conventional automatic record players are prone to cause distortion in the reproduced sound due to the danger which must exist of the stylus becoming partially dislodged in the record groove during actual record playing, by aforesaid reactive, lateral force. It is significant that the stylus must not merely be in the record groove, but must be thoroughly seated therein to avoid tracking distortion.

(7) Conventional automatic record players are prone to cause groove jumping of their styli out of the 45 degree slanting groove walls of records, resulting from the aforesaid reactive, lateral force.

(8) Conventional automatic record players create a problem in authentically, accurately rating the value of either the reactive, lateral force they exert on the record groove, or the downward, vertical stylus tracking force they require to be used on the record groove for sound pickups used thereon. This is due to susceptibleness of the conventional automatic record player to manufacturing variations.

(9) In conventional automatic record players, "cuing" on a record is defeated. This is because a lateral movement of the pickup arm means, caused thereby, before the playing of the final recorded sound has actually taken place, can cause it immediately to perform an essential modern automatic function.

(10) Because the aforesaid reactive, lateral force tends to push the stylus completely out of the 45 degree slanting wall of a record groove, essential modern automatic record playing functions can not be performed by a conventional automatic record player when the terminal portion of the record groove is too shallow, as it sometimes is, for such performance, but not too shallow to be tracked by normal, purely manual record playing.

It is significant that the vertical and lateral pressures, which have been discussed above, which are exerted by the stylus of the conventional automatic record player on the sound-engraved record grooves and are demanded, solely, for the obtaining of essential modern automatic record playing functions by modern conventional automatic record players, and are not demanded for the actual playing of records, are detrimental to all records, especially to present day high fidelity microgroove records. Such pressures caused excessive wear on the records and, accordingly, all records were increasingly impaired, which resulted in an increasing reduction of their original high quality and realism.

Although the aforesaid sound impairing deficiencies inherent in the conventional automatic record players and changers are always audible when reproduced by most any associated sound reproducing equipment, it should be pointed out that such deficiencies are still considerably more audible whenever reproduced through very high quality sound pickups, amplifiers and loud speaker systems.

B. Because of the structural disposition of the conventional automatic record player as heretofore constructed, the location of its sound pickup means must be positively-fixed relative to its turntable means, since its automatic apparatus for moving its pickup arm means inherently is interconnected to, and relies for its operation on, its turntable means and/or its turntable motor means.

The following are the undesirable results and limitations imposed by this structural disposition of the conventional automatic record player:

(1) Because of its above-said positively-fixed location of its pickup arm means, the conventional automatic record player is incapable of enabling pickup arms of more than one length to be utilized, unless a major reconstruction is made to its apparatus.

(2) In the full automatic playing of single records, a conventional automatic record player, because of its above-said inherent interconnection to its turntable means and/or its turntable motor means, is incapable of utilizing any modern precision turntable in exactly the same condition as supplied, without alteration being made to said turntable and/or the motor means of said turntable and/or a major reconstruction being made to its apparatus.

(3) Because of its above-said inherent interconnection of its automatic apparatus for moving its pickup arm means to its turntable means and/or its turntable motor means, a problem is imposed by the conventional automatic record player in keeping turntable and/or turntable motor means rumble vibrations from reaching the pickup arm means by way of its automatic apparatus; and it is therefore further entirely incapable of obviating wear which is imposed by its automatic apparatus on its turntable means and/or on its turntable motor means, which wear can cause rumble, wow and/or flutter in the reproduced sound.

C. Because of the structural disposition of the conventional automatic record player, it possesses a very complex mechanism involving various components being struck at high speed.

The following is the undesirable result imposed by this structural disposition:

(1) Because of its above-said complex mechanism involving various components being struck at high speed, the conventional automatic record player is prone to create very distributing apparatus noises.

To actually illustrate that the real necessity for the novel apparatus according to this specification has existed for many years, and thus, the extreme unobviousness of it, in light of the very real need for it, it is considered very significant that both precision machined turntables on which records must be played by hand, and the usual conventional automatic record players have been shown in catalogs, at least, since the year of 1941; and that, at least since the year of 1952, there have been many installations wherein, in an effort to solve the puzzling record player dilemma, both a conventional automatic record player as heretofore constructed, and an independent high quality pickup arm means used with a precision machined turntable on which records must be played by hand, have been included in the same installation.

However, even such installations, although they may appear to actually solve the record-player-problem, are really unsatisfactory, because the following drawbacks, though possibly unobvious, become inevitable:

In such installations equipped with both an automatic, and a purely manual, record player, those records, which are played on the conventional automatic record player, inevitably, will be depreciated fidelitywise for a later playing on the purely manual record player, because of the aforesaid damaging wear the conventional automatic record player inflicts on the sound-engravings of those records which are played on it. Moreover, in such installations, when playing records on the purely manual record player, all of the inherent drawbacks of the purely manual record player are present, and must be accepted, such as inconvenience and lack of easy, careful placing of the stylus on the record. Furthermore, in such installations, when playing records on the conventional automatic record player, all of the inherent drawbacks of the conventional automatic record player, enumerated hereinbefore, then are present, and also must be accepted. Much valuable space must be wasted by two units, and such installations, because they require two units, as well as a larger cabinet, are inevitably expensive.

The chief aim of the present invention is to overcome all the aforesaid many drawbacks and limitations which have existed in the only means which, prior to this invention, were available for playing records, and thereby, at the same time to fill a definite void which has existed for a great many years in the record playing art. This is accomplished by a novel, entire automatic apparatus which is based on an entirely new concept for accomplishing essential modern, automatic and manually-operable semi-automatic, record playing functions, and also for accomplishing automatic record-changing.

This entirely new concept, and chief object of this invention, is to provide a novel automatic record player which enables essential modern, automatic and manually-operable semi-automatic, record playing functions with those inherent many useful capacities, and highly desirable results, afforded by an independent, high quality pickup arm used with an independent, precision machined turntable on which records must be played by hand.

Moreover, with the further inclusion of structure for enabling automatic playing of records of different preselected diameters, these important and very useful capacities and important, highly desirable results are still obtained.

An apparatus affording said highly desirable capacities and highly desirable results in its full automatic playing of a single record, is obviously also extremely advantageous when applied to automatic record-changing, to thus also obtain a much longer-playing-time, and therefore the apparatus according to this specification further affords structure for the obtaining of automatic record-changing, without imposing substantial reduction in such highly desirable results nor obviation of all of such highly desirable, useful capacities.

Such an apparatus, of course is not limited, nor is said chief object limited, to aforesaid high quality pickup arm means and turntables but can be applied to pickup arms and turntables of almost any quality with distinct advantage.

The results and objects of the present invention are realized in practice, as hereinafter more fully disclosed, in an automatic record playing and automatic record-changing apparatus providing all the following essential modern, automatic and manually-operable semi-automatic, record playing functions, namely: manually-operable means which is operable for semi-automatically moving the pickup arm means from a position wherein it is stationary and its stylus is removed from contact with the record to a respective play-starting position at the start of a record of a preselected diameter, which is further operable for semi-automatically moving the pickup arm means from any playing of the record position to the said position wherein it is stationary and its stylus is removed from contact with the record, and which is still further operable for semi-automatically moving the pickup arm means from any playing of the record position to a position laterally clear of the record and then on back to respective play-starting position at the start of the record of a preselected diameter; further provides automatically operative means which is operative after the playing of the final recorded sound for automatically moving the pickup arm means to said position wherein it is stationary and its stylus is removed from contact with the record, and which is further operative after the playing of the final recorded sound for automatically moving the pickup arm means to a position laterally clear of the record and then on back to a respective play-starting position at the start of the record of a preselected diameter; still further provides automatically operative means which is operative after the playing of the final recorded sound to stop rotation of the turntable means; and said apparatus also includes means for automatic record-changing.

The following, A1, B1 and C1, set forth the excellent operating characteristics, highly desirable results and useful capacities provided by the novel automatic record player according to this specification because of its structural disposition. This novel automatic record player obviates the inherent drawbacks of the conventional automatic record player as heretofore constructed, and thus enables the same record playing performance as afforded by the purely manual record player.

A1. Because of the structural disposition of this novel automatic record player according to this specification, all the above mentioned functions are accomplished by an entire automatic apparatus that, in accordance with the chief objective, does not require a delicate stylus suspension in a sound pickup to serve as a medium for transmitting any force whatsoever to the pickup arm means for performing any of these above functions, nor does the portion of the automatic apparatus for causing movement of, nor does the portion of the automatic apparatus for actually physically moving, the pickup arm means to perform those above functions add, or require the addition of, any force whatsoever, lateral or otherwise, to the stylus or to the record groove.

Consequently, in contrast to the conventional automatic record player, in this apparatus, just as in purely manual record playing, the mass of the entire moving portion of the pickup arm means naturally is made to the inertia required for the selected low frequency resonance of the pickup arm means, is free-floating on anti-friction pivots, and is unhindered by any other external forces whatsoever acting on it, other than the record groove itself, from the time the stylus has been lowered into contact with the record in play-starting position at the start of the record until the time when the stylus is being lifted from contact with the record after the playing of the final recorded sound. Thus, it is possible to adjust the pickup arm to produce a very low stylus pressure on the record, i.e. with just sufficient downward, vertical, stylus pressure on the record to insure proper tracking of the record groove, for the sole purpose of properly reproducing sound therefrom.

The following are the many highly desirable new results and highly desirable new capacities which are afforded by the above-stated structural disposition of the apparatus according to this specification:

(1) In contrast to the conventional automatic record player; this novel apparatus affords utilizing of a very high quality sound pickup possessing an extremely high stylus compliance, i.e. too high to be recommended for use in conventional automatic record players, even while the essential modern, automatic and manually-operable semi-automatic, record playing functions are being performed and maintained operative. This is because of the above-stated structural disposition of this novel apparatus, wherein its delicate stylus suspension in its sound pickup is not required to serve as a medium to transmit any force whatsoever to its pickup arm means to perform said function.

Consequently, with the development of this apparatus, no one will be any longer deprived of obtaining the benefits of this very high quality sound pickup while being provided with essential modern automatic and manually-operable semi-automatic record playing functions, and from this standpoint the present apparatus, in reality, is also a "completely-new" and useful apparatus.

(2) In contrast to the conventional automatic record player; in this novel apparatus, even while the essential modern, automatic and manually-operable semi-automatic, record playing functions are being performed and maintained operative: no wear whatsoever is created on the stylus, by its automatic apparatus for moving the pickup arm means to perform these functions. This is because of the above-stated structural disposition of this novel apparatus wherein its said automatic apparatus does not add, nor require the addition of, any force whatsoever to the stylus.

(3) In contrast to the conventional automatic record player; in this novel apparatus, even while the essential modern, automatic and manually-operable semi-automatic, record playing functions are being performed and maintained operative: no wear whatsoever is created on the delicate sound-engravings on the record groove, by its automatic apparatus for moving the pickup arm means to perform these functions. This is because of the above-stated structural disposition of this novel apparatus wherein its said automatic apparatus does not add, nor require the addition of, any force whatsoever to the record groove.

(4) In contrast to the conventional automatic record player; in this novel apparatus, even while the essential modern, automatic and manually-operable semi-automatic, record playing functions are being performed and maintained operative: no record surface noise whatsoever is created with the reproduced sound, due to its automatic apparatus for moving the pickup arm means to perform these functions. This is because of the above-stated structural disposition of this novel apparatus wherein its said automatic apparatus does not add, nor require the addition of, any force whatsoever to the stylus or to the record groove.

(5) In contrast to the conventional automatic record player; in this novel apparatus, even while the essential modern, automatic and manually-operable semi-automatic, record playing functions are being performed and maintained operative: distortion in the reproduced sound can not possibly be caused by the stylus in any sound pickup being displaced, due to its automatic apparatus for moving the pickup arm means to perform these functions. This is because of the above-stated structural disposition of this novel apparatus wherein its said automatic apparatus does not add any lateral force whatsoever to the stylus.

(6) In contrast to the conventional automatic record player; in this novel apparatus, even while the essential modern, automatic and manually-operable semi-automatic, record playing functions are being performed and maintained operative: distortion in the reproduced sound can not possibly be caused by the stylus becoming in any way dislodged in the record groove, due to its automatic apparatus for moving the pickup arm means to perform these functions. This is because of the above-stated structural disposition of this novel apparatus wherein its said automatic apparatus does not add any lateral force whatsoever to the stylus.

(7) In contrast to the conventional automatic record player; in this novel apparatus, even while the essential modern, automatic and manually-operable semi-automatic, record playing functions are being performed and maintained operative: groove jumping by the stylus can not possibly be caused, due to its automatic apparatus for moving the pickup arm means to perform these functions. This is because of the above-stated structural disposition of this novel apparatus wherein its said automatic apparatus does not add any lateral force whatsoever to the stylus.

(8) In contrast to the conventional automatic record player; in this novel apparatus, even though the essential modern, automatic and manually-operable semi-automatic, record playing functions are being performed and maintained operative: an accurate rating of zero value of lateral force being exerted at all times, by its automatic apparatus for moving the pickup arm means to perform these functions, on its stylus and on the entire grooves of all records which are played on it is enabled to be made, authentically, for each and every automatic record player which is made in accord with this invention and also such a rating is enabled to be made, authentically, for the lifetime of each said player as well. This is because normal variations in manufacturing of this apparatus can not possibly alter the established rating of zero value of lateral force required to be added by the record groove on the stylus to obtain these functions; and there are no impact forces to cause misadjustment; nor can foreign matter, burrs and/or dirt in its automatic apparatus for moving the pickup arm means to perform these functions, at any time, alter said rated value.

(9) In contrast to the conventional automatic record player; in this novel apparatus, even while the essential modern, automatic and manually-operable semi-automatic, record playing functions are being performed and maintained operative; the usefulness of "cuing" is afforded. This is because its automatic apparatus for moving the pickup arm means to perform these functions has been devised so that lateral movement of the pickup arm means can cause essential modern automatic record playing functions, solely, after the playing of the final recorded sound, and hence any favorite portion of the record may be played manually, without possibly undesirably causing an essential function to be started.

(10) In contrast to the conventional automatic record player; this novel apparatus actually obtains essential modern automatic record playing functions after the playing of the final recorded sound, when playing those records wherein the terminal portion of their groove, heretofore, was too shallow to enable the performance of these functions on conventional automatic record players, but was deep enough to be actually tracked in normal purely manual record playing. This is because of the above-stated structural disposition of this novel apparatus wherein its automatic apparatus for moving the pickup arm means to perform these functions does not add any lateral force whatsoever to the stylus.

B1. Because of the structural disposition in the novel apparatus according to this specification, in further contrast to the conventional automatic record player, all the essential modern, automatic and manually-operable semi-automatic, record playing functions are completely operable while the entire automatic apparatus for moving the pickup arm means to perform said functions, which automatic apparatus includes its own control motor means, is, at all times, entirely in spaced relationship to both the turntable means and the turntable motor means, and therefore, obviously, inherently its entire automatic apparatus for moving its pickup arm means can be readily positioned in numerous locations relative to, and apart from, both the turntable means and the turntable motor means.

The following highly desirable new results and highly desirable new capacities are afforded by the above structural disposition of the apparatus according to this specification:

(1) In contrast to the conventional automatic record player; this novel apparatus enables utilizing of pickup arms of various practical lengths without any reconstruction being made to its automatic apparatus for moving the pickup arm means. Thus, either the longer pickup arm, which is capable of superior performance, or the shorter pickup arm having its advantage in compactness although providing a slight sacrifice in performance, may inherently be readily used. This is because of the above-stated structural disposition of this novel apparatus wherein inherently its entire automatic apparatus for moving the pickup arm means can be readily positioned in numerous locations relative to, and apart from, both the turntable means and the turntable motor means.

(2) In contrast to the conventional automatic record player; this novel apparatus enables, in full automatic playing of single records, utilizing of any modern precision turntable in exactly the same condition as supplied, without any alteration whatsoever being made to said turntable and/or to the motor means of said turntable and/or to its automatic apparatus for moving the pickup arm means. This also is because of the above-stated structural disposition of this novel apparatus wherein inherently its entire automatic apparatus for moving the pickup arm means can be readily positioned in numerous locations relative to, and apart from, both the turntable means and the turntable motor means.

(3) In contrast to the conventional automatic record player; this novel apparatus entirely obviates the inflicting of any wear whatsoever, by its automatic apparatus for moving the pickup arm means, on its turntable means and/or on its turntable motor means, and thus entirely obviates any possibility of rumble, wow and/or flutter being caused in the reproduced sound by such wear. This novel apparatus further obviates rumble vibrations and other noise vibrations of the turntable means and/or the turntable motor means from being transmitted to the pickup arm means by way of its automatic apparatus for moving the pickup arm means, to be then intermodulated with the vibrations from the sound-engravings on the record groove and to thus distort the reproduced sound. This likewise is because of the above-stated structural disposition of this novel apparatus wherein inherently its entire automatic apparatus for moving the pickup arm means can be readily positioned in numerous locations relative to, and apart from, both the turntable means and the turntable motor means.

C1. An electrical equivalent of the prior art mechanical apparatuses, after the initiation of a pickup arm movement, ordinarily then required actuation of a number of additional electrical devices to maintain an electrical circuit energized for controlling the maintaining of the movement of the pickup arm entirely to its destination; or an additional mechanical device for controlling the maintaining of the movement of the pickup arm entirely to its destination. Such apparatuses were prone to cause disturbing apparatus noises and/or excessive electrical contact arcing and pitting.

Another object of this invention, which is included in the chief object, is to overcome these drawbacks, by providing a novel complete primary electrical control for obtaining all the maintainings, and all the initiatings, of all of the various essential modern, automatic and manually-operable semi-automatic, movements of the pickup arm means, and also automatic record-changing, by solely a single electrical sensing means adapted for multi-purpose use wherein the sensing means forms a mechanically fixed electrical connection in its electric circuit during its complete operation.

The following highly desirable new result is afforded by the above structural disposition of the apparatus according to this specification:

(1) In contrast to the conventional automatic record player; this novel apparatus performs all essential modern, automatic and manually-operable semi-automatic, record playing functions without disturbing apparatus noises. This is because of the above-stated structural disposition of this novel apparatus wherein its sensing means forms a mechanically fixed electrical connection in its electric circuit during the performance of, all, said complete functions, which includes both their maintaining and their initiating, and furthermore all said functions are accomplished solely by this single sensing means in a primary electrical control operation which is thus silent and also positive and without objectionable contact pitting and/or oxidation and/or without make-and-break contact noises in said primary electrical control operation.

The following is also significant:

(1) This novel apparatus, even while affording all the excellent, highly desirable results and useful capacities set forth in the preceding summary; also of course affords the highly desirable, convenience obtained by affording the performance of, all, essential modern, automatic and manually-operable semi-automatic, record playing functions.

(2) This novel apparatus, even while affording all the excellent, highly desirable results and useful capacities set forth in the preceding summary; also of course affords very careful placing of the stylus on the record in play-starting position at the start of the record, to thereby prevent possibility of damage to the stylus and/or misadjustment and/or damage to any delicate elements in the sound pickup being used on it, which, obviously, can easily happen due to a stylus being struck on the outer, rotating edge of a record when records must be played by hand.

In the drawings, FIG. 1 shows the top plan view of a sound reproducing apparatus conveniently embodying this invention.

Figures 3, 4:
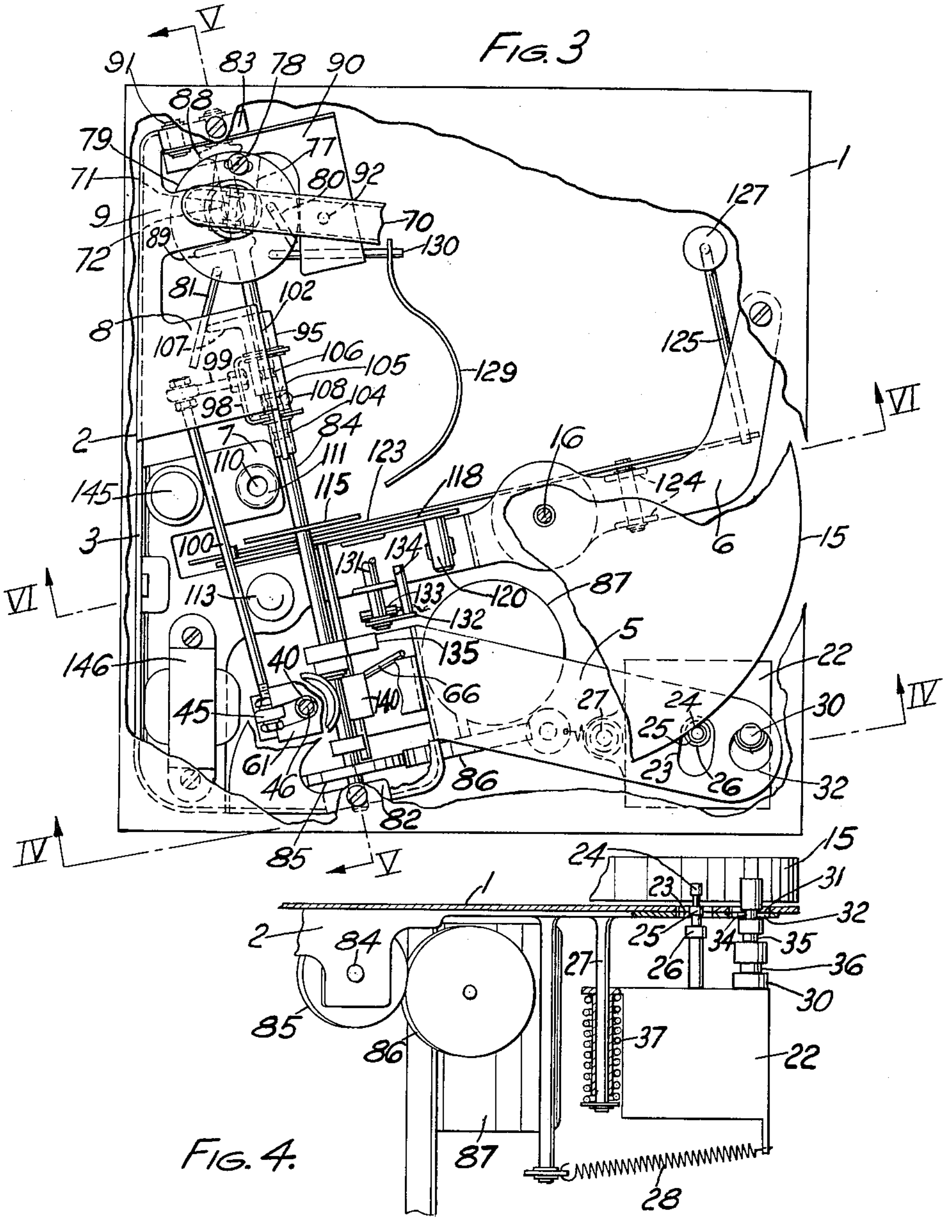
FIG. 3 is a plan view of the apparatus with portions broken away to expose underlying parts which would otherwise be hidden, and showing other parts in horizontal section.
FIG. 4 is a fragmentary view in vertical section taken as indicated by the angled arrows IV—IV in FIG. 3.

As herein exemplified, this improved sound reproducing apparatus comprises, see FIGS. 1–6, a square bed plate 1, for mounting, which is suitably secured to a foundation frame 2. For the sake of strength and rigidity, the frame 2 is preferably formed as a casting of metal having a deep vertical flange portion 3 in line with the rear side edge of the bed plate 1, and forwardly extending horizontal portions 5, 6, 7, 8 and 9 upon which said bed plate is directly supported. Set into a pendent boss 10 on the portion 6 of the frame 2, is a bearing 11 for a short tubular shaft 12 which protrudes upwardly through a clearance aperture 13 in the bed plate 1, and upon which is supported the record turntable 15. The turntable 15 is preferably of heavy aluminum, accurately machined so as to be in perfect dynamic balance, and of a circular area to fully support disk records (twelve inch) of the largest commercial type. Passed down through the tubular shaft 12 is a removable center post 16 (commonly referred to as a spindle) whereof the bottom end is cut away at one side so as to be held against rotation in a semicircular aperture in a plate 17 covering the bottom of the bearing boss 10. The upper end of the post 16 is inclined toward the record platform, indicated at 20, and is shouldered as at 21 to assist in temporarily sustaining unplayed records, such as the one designated R, in readiness to be later released to drop onto the turntable 15, or onto the record R′ already in playing position on said turntable. As best shown in FIGS. 3 and 4, the turntable 15 is arranged to be rotated by an A.C. electric motor 22 whereof the shaft extends up through registering clearance slots 23 in the bed plate 1 and in the frame 2, and is provided with three pinion wheel bands 24, 25, 26, of different diameters for selective use in driving the turntable 15 by the frictional peripheral engagement respectively at 33⅓ r.p.m., 45 r.p.m. and 78 r.p.m., depending on the type of records to be played. The motor 22 is pivotally mounted to swing about a pendent stud projection 27 of the foundation frame 2, and is yieldingly urged toward the turntable 15 by an overcenter or toggle spring 28 for maintenance of the collars 24—26 on its shaft, individually, in driving engagement with said turntable 15. Secured to the casing of the motor 22 in eccentric relation to the motor shaft, is a stud 30 which extends upwardly through large and small clearance holes 31 and 32 respectively in the bed plate 1 and in the portion 5 of the foundation frame 2. From FIG. 4 it will be noted that the stud 30 has three spaced circumferential grooves 34, 35 and 36 of different radii which correspond to the three collars 24, 25 and 26 of the motor shaft, and which are adapted to be selectively engaged with the edge of the hole 32 in the frame portion 5, upon bodily adjustment of the motor 22 vertically of the stud 27, whereon it is pivoted. The helical compression spring, shown at 37 in FIG. 4, tends to urge the motor 22 upward to keep the bottom shoulder of the selected groove 34, 35 or 36 of the stud 30 engaged with the bottom of the portion 5 of the foundation frame 2 with the motor 22 releasably held in the desired adjusted position. It is to be understood that the depth of the grooves 34–36 in the stud 30 is such as not to interfere with the effective contact of the different collars 24–26 on the motor shaft with the periphery of the turntable 15.

Figures 1, 2:
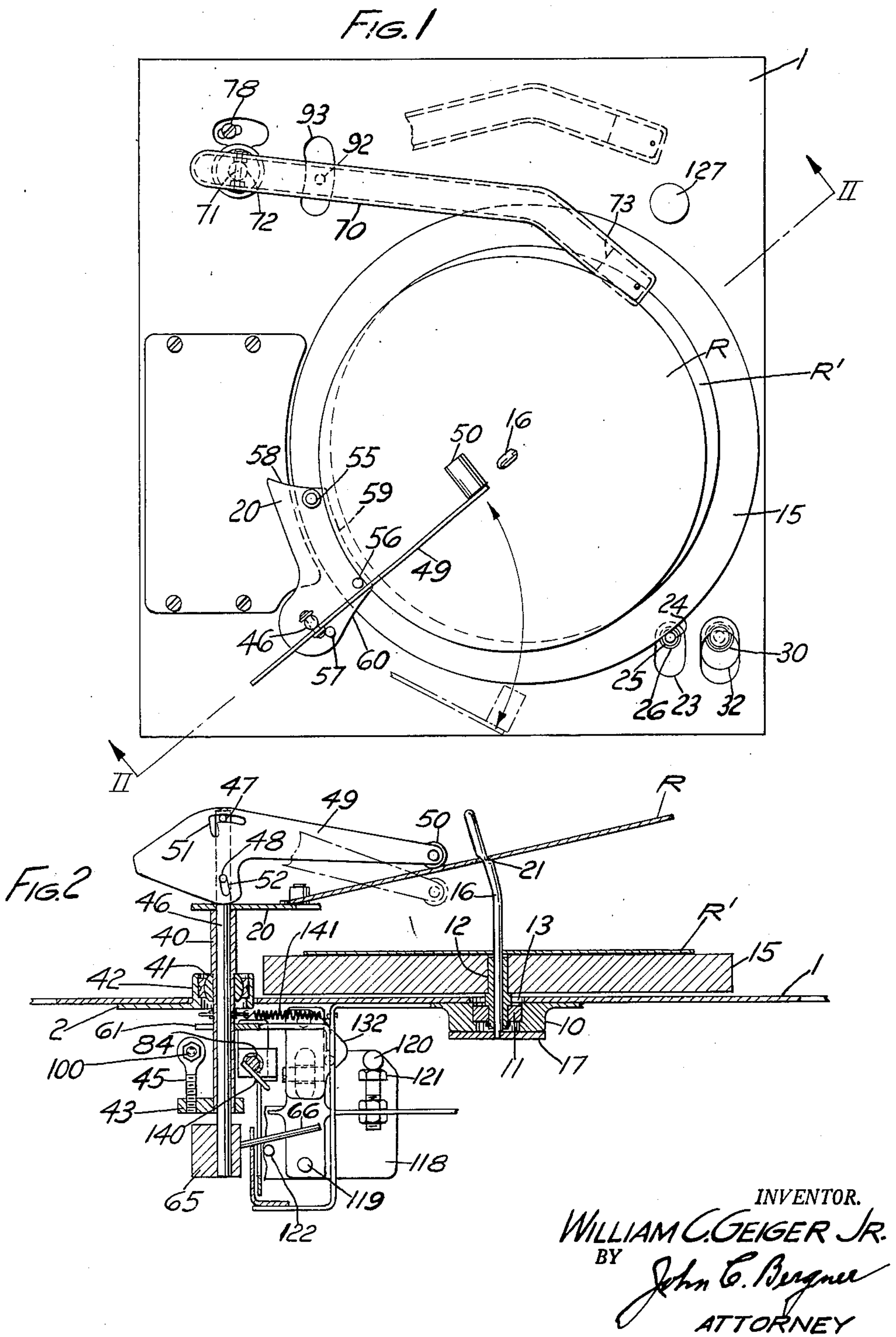
FIG. 2 is a fragmentary sectional view taken as indicated by the angled arrows II—II in FIG. 1.
Figure 5:
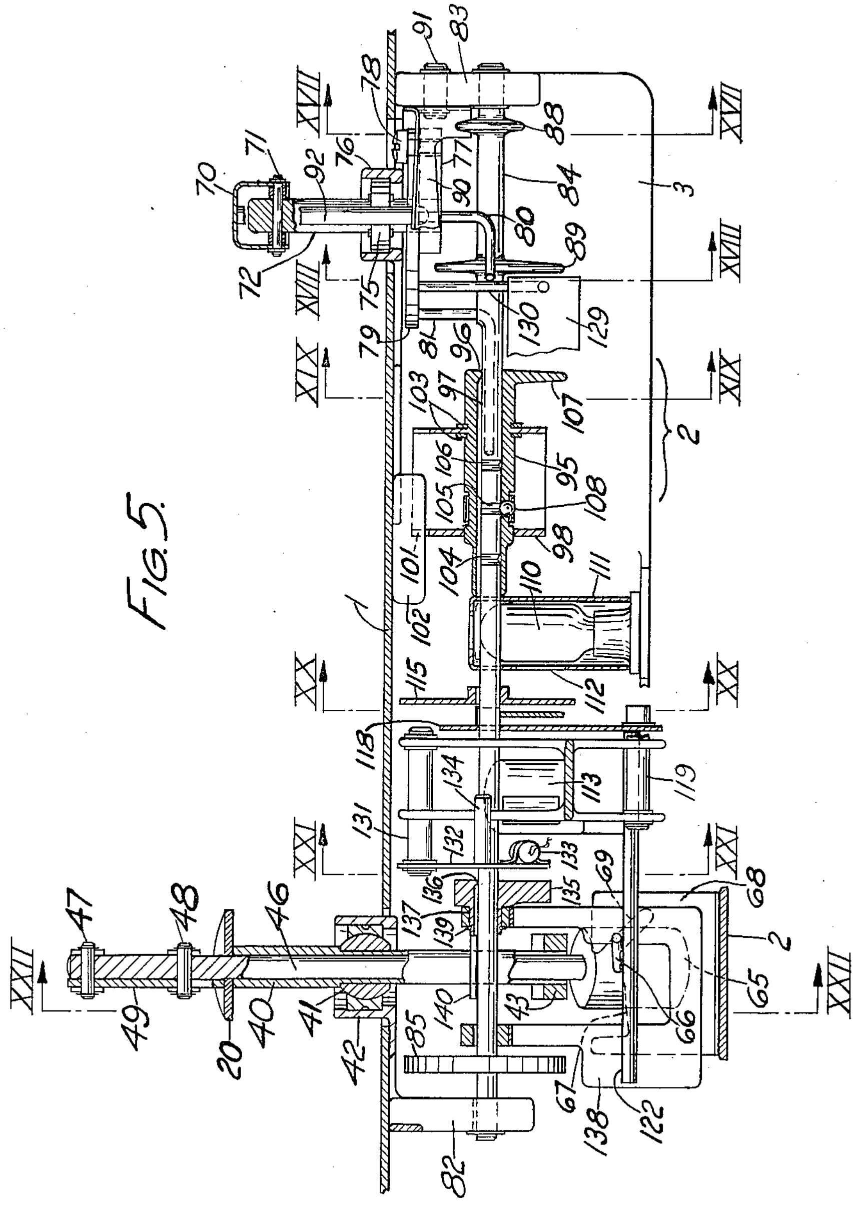
FIG. 5 is a vertical section of the apparatus taken as indicated by the angled arrows V—V in FIG. 3.

The record platform 20, hereinbefore referred to, is rigidly connected to or integrally formed with a vertical tubular shaft 40 at the top of the latter, as best shown in FIGS. 2 and 5, and is sustained by said shaft at a level such that the unplayed record R is temporarily supported substantially at right angles to the inclined upper end portion of the post or spindle 16. About midway of its height, the tubular shaft 40 is formed with the sphere 41 which has bearing in an upstanding boss 42 of the foundation frame 2; and secured to the bottom end of said shaft is a short arm 43 with an upstanding eye projection 45 at the distal end thereof. Extending down through the tubular shaft 40 is a shaft 46 in the upper protruding end portion of which are secured, in vertically spaced relation, diametral pins 47 and 48 with which the record drop over lever, indicated at 49 in FIGS. 1 and 2, is engaged. As shown, this lever 49 is struck from stiff sheet material and, at its distal end, is provided with a roller 50 which is adapted to bear directly upon the top of the unplayed record or records beyond the inner terminus of their playing grooves. As best shown in FIG. 2, the lever 49 is formed with an angular slot 51 for passage through it of the pin 47, and also with a straight vertical slot 52 for passage through it of the pin 48. Referring again to FIG. 1, the record platform 20 is of wing-like configuration, and is provided with upstanding push studs 55, 56 and 57 respectively disposed adjacent concavely curved edge portions 58, 59 and 60 of different radii. In FIG. 1, the platform 20 is set for the support of medium size (10 inch) records in which the stud 56 is positioned to function, and the edge portion 59 is concentric with the axis of the turntable 15. By turning the support 20 counterclockwise in FIG. 1, the pin 57 will be moved into position to function for larger records (12 inch), with the edge 60 brought into concentric relation to the turntable axis. On the other hand, by turning the support 20 clockwise from the position of FIG. 1, it can be set to move the pin 55 in readiness to function for small records (7 inch), with the edge 58 concentric to the turntable axis, as will be readily understood. In rocking about the spherical bearing 41 for successive displacement of the unplayed records from the shoulder 21 of the spindle 16 as later on more fully explained, the tubular shaft 40 and the parts carried thereby are constrained to move in a plane approximately radial to the turntable axis through sliding engagement of said shaft in a clevised guide plate 61 (FIGS. 2 and 3) secured to or integrally formed with the foundation frame 2. To the bottom protruding end of the shaft 46 is affixed a weight collar 65, which has a radial finger projection 66 arranged to ride upon the cam edge 67 of the stationary cam plate 68 secured to or integrally formed with the foundation frame 2, said cam plate having an inclined cam slot 69.

The pickup arm of the apparatus is designated 70 in FIGS. 1, 3 and 5, the same being fulcrumed for up and down movement about a diametral pin 71 in the top end of a vertical pivot shaft 72, and being provided at its distal end with a sound pickup 73, which may be any high stylus compliance low rated stylus pressure commercial type. The pickup arm 70 is of such length and its pivot shaft 72 is so disposed relative to the turntable 15 that the stylus of the sound pickup 73 is constrained to move in a line which is substantially straight and radial to the turntable axis. As shown in FIGS. 3 and 5, the shaft 72 is rotatively supported in a ball bearing 75 set into an upstanding boss 76, of the portion 9 of the foundation frame 2; and fast on the bottom end of the shaft 72, below the bed plate 1, is an arm 77 whereto is secured, with capacity for slight rotative adjustment by means of a cap screw 78, a disk 79 having rigidly affixed thereto pendently, a pair of circumferentially spaced projections in the form of fingers 80 and 81 which are angular in configuration, as best seen in FIG. 5, and which will again be referred to presently.

Journalled at its opposite ends in bearing lugs 82 and 83 on the foundation frame 2, is a horizontal shaft 84 which, through friction wheels 85 and 86 (FIGS. 3 and 4), is arranged to be driven by a D.C. electric motor 87 suitably supported from the portion 5 of said frame beneath the bed plate 1. Fixed on the shaft 84 are two rotary cams 88 and 89 (FIGS. 3, 5, 17, and 18). Resting on the lift cam 88 is a follower lever 90 which is fulcrumed at 91 on the foundation frame 2, and on which bears, at the distal end, the pendent pin 92 of the pickup arm 70, said pin extending down through another arcuate slot 93 (FIG. 1) in the bed plate 1 concentric with the shaft 72. The return rotation cam 89, by cooperation with the finger projection 80 of the disk 79 on the shaft 72, is relied upon to swing the pickup arm 70 back to retracted position in which it is shown in broken lines in FIG. 1 after the playing of each record, as further explained later on. Shiftable along the shaft 84 is a sleeve 95 which has a key projection 96 which slidably engages a longitudinal flat 97 on said shaft, and is thereby obliged to rotate with the latter. Embracing the sleeve 95 is a yoke 98 having a laterally projecting arm 99 which, through a link rod 100, is connected to the eye 45 (FIGS. 2 and 3) of the arm 43 at the lower end of the tubular shaft 40. The ends of the rod 100 have a ball socket fit respectively in the arm 99 and in the eye 45 so as to avoid imposition of any binding strains, and the yoke 98 is restrained against rotation about the sleeve 95 through engagement of peripheral notches 101 in its extremities with a pendent guide rib 102 on the portion 8 of the foundation frame 2. From FIG. 5 it is to be noted that one of the extremities of the yoke 98 is engaged between a pair of circumferential rings 103 on the sleeve 95 which is therefore obliged to move with the yoke longitudinally on the shaft 84. At one end of the sleeve 95 is formed with an indexing cam 107 which, by cooperation with the finger projection 81 of the disk 79 on the shaft 72 of the pickup arm 70 is adapted to cause said arm to be moved into play-starting position, as will also be explained more fully hereinafter.

To determine placement of the pickup arm 70 in different play-starting positions respectively for seven, ten and twelve inch records, a means is provided for holding the sleeve 95 in corresponding locations on the shaft 84 so as to vary the relationship of the indexing cam 107 on the sleeve 95, to the finger 81, of the disk 79 on the fulcrum shaft 72 of the pickup arm, and so predetermine the extent of inward movement imparted to said arm. This means comprises a spring-pressed ball 108 for selective engagement with three circumferential grooves 104, 105 and 106 in the shaft 84.

Mounted on the foundation frame 2 is a sensing means including an element in the form of a photoelectric tube 113, on portion 6 and a light bulb 110 on a portion 7 of said foundation frame 2. Said light bulb is surrounded by an opaque shield 111 (FIGS. 3 and 13) having a rectangular slit 112 therein at an inclination radial to the shaft 84, the light beam projected through the slit by said bulb being directed to impinge upon the photoelectric tube. A maintaining means in the form of a maintaining mask 115 is used for maintaining interception of said light beam after interception of the light beam has been initiated, to maintain influence upon the sensing means for a predetermined time interval, and is affixed to the shaft 84, said mask having, as shown in FIGS. 6–11 and in FIG. 14, a rectangular aperture 116 and a rectangular peripheral notch 117 at an angle of substantially ninety degrees from said aperture. Located forwardly of the maintaining mask 115 is an auxiliary mask 118 which, as shown in FIGS. 6–11 and in FIG. 15, is of plate matrial and irregular U shaped in configuration, the same being pivoted on a stud projection 119, on the portion 6 of the foundation frame 2. Under certain conditions, the auxiliary mask 118 occupies the position in which it is shown in FIGS. 2, 6–9 and 11 with a counterbalance weight lug 120 at the top of the wider leg of the U resting upon the top of an upstanding stop screw 121 anchored in the foundation frame. Extending forwardly from the auxiliary mask 118 medially of its length and adjacent the bottom, is a rod 122 which reaches into the path of the finger 66 on the weight collar 65 at the bottom of the shaft 46.

Operative, in the interval, between the maintaining mask 115 and the auxiliary mask 118 is a manual initiating means in the form of a third masking element for initiating interception of said light beam which is constituted by one end of the flat start and reject lever 123, fulcrumed at an intermediate point upon the pendent lugs 124 on the portion 6 of the foundation frame 2, the other end of the lever having secured to it a rod 125 which extends up through a clearance hole 126 in the bed plate 1 and which, at its top protruding end, is provided with a press button 127. The mask end of the lever 123 underreaches a lug projection 128 at the top of the short leg of the U shaped auxiliary mask 118. In addition to the light beam intercepting masks already described, there is also an automatic initiating means in the form of another masking element 129 for initiating interception of said light beam upon the completion of the playing of the final recorded sound, see FIGS. 3, 8 and 16, which is secured to the end of another finger projection 130, of the collar 79 on the fulcrum shaft 72 of the pickup arm 70.

Freely hung from a stud projection 131 on a portion 6 of the foundation frame 2 (FIGS. 3 and 5) is a member 132 which, at the back thereof, carries a mercury switch 133, swing of this member toward the shaft 84 being prevented by the stop at 134. The member 132 is arranged to be actuated by a cam arm 135 on the shaft 84. As shown in FIG. 5, the cam arm 135 has a sliding key engagement 136 with a flat on the shaft 84 and, as best shown in FIG. 5, is formed with a boss 137. The U shaped element designated 138 has one of its legs loosely engaged about the shaft 84 and its other leg similarly engaged about the boss 137 of the cam arm 135. By means of a snap ring 139, the cam arm 135 is maintained in assembled relation with the element 138. It will be noted that the finger projection 66 of the weight collar 65 at the bottom end of the shaft 46 projects through the interval between the legs of the U shaped element 138, which is disposed adjacent to and in parallel relation with the fixed cam 68.

Secured to the shaft 84 is still another cam arm 140, which is adapted by engagement with the tubular shaft 40, below the bed plate 1, to impart, in opposition to the resistance of the spring indicated at 141 in FIG. 2, the record push-off movement to the record platform 20.

Figure 24:
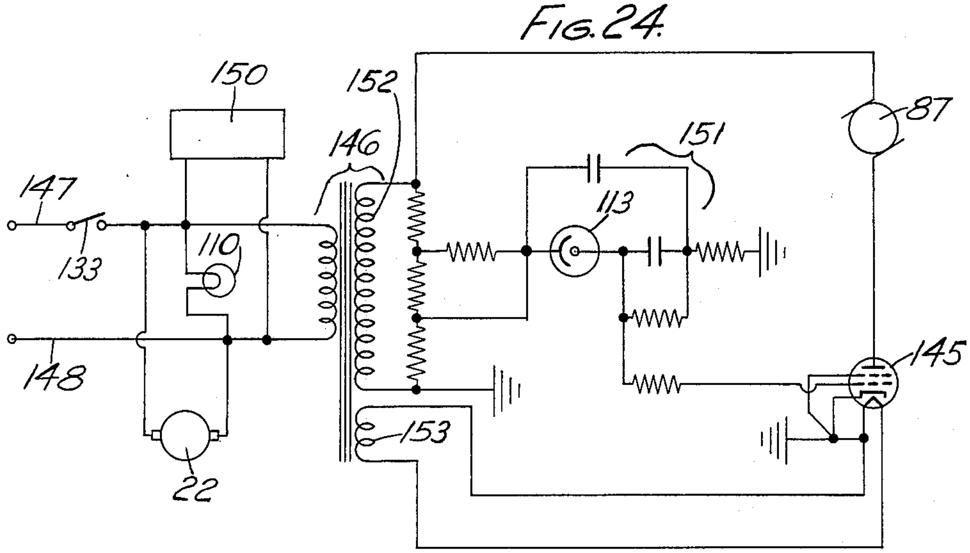
FIG. 24 is a wiring diagram of the various electrical instrumentalities embodied in the apparatus.

In addition to the electrical instrumentalities, hereinbefore described, a thyratron tube 145 is utilized which is mounted, adjacent to the light bulb 110 on the portion 7 of the foundation frame 2, and a transformer 146 which is mounted on said frame adjacent the photoelectric tube 113. From FIG. 24 it will be noted that the turntable driving motor 22 and the light bulb 110 are connected across the conductors 147 and 148 of a circuit in which the mercury switch 133 is interposed, and which is adapted to be supplied with A.C. current, say 110 v., from any suitable power source. The amplifying unit, conventionally indicated at 150, for the sound reproducing equipment used with the automatic record player and record changer is also connected across the conductors 147 and 148 so as to be energized concurrently with the motor 22 and the bulb 110, upon closing of the mercury switch 133. The network 151 for the photoelectric tube 113 and the thyratron tube 145 may be conventional as shown in FIG. 24, and are fed from the portion 152 of the secondary winding of the transformer 146, while the filament of the thyratron tube is supplied with current from the portion 153 of the transformer secondary.

Before presenting a step by step detailed description of this improved sound reproducing apparatus, the necessary overall conception to be obtained from said description, will be much clearer and more easily visualized, by outlining, in advance, the following brief, general explanation, which sets forth all primary operations and functions involved in the performance of this invention. This preface will also serve to provide an idea, in advance, of the component elements referred to later on in detail.

Referring to FIGS. 1–5, there is just one main operating shaft 84 with cams thereon, said cams, by the movement they impart to their associated elements, cause the performance of all essential modern, automatic and manually-operable semi-automatic, record player and changer functions in the required relative time sequence, namely: movement of the pickup arm 70 from the normal retracted position in which it is shown dotted in FIG. 1, to play-starting position on the record R' on the turntable 15 in which it is shown in solid line in FIG. 1; return of the pickup arm 70 to the normal retracted position, either after it reaches the end of play position of the record, or by rejection means before it has reached the end of play position of the record; lowering of another record R, in FIGS. 1 and 2, from the platform 20 and the spindle support ledge 21 onto the turntable 15; and a repetition of the movement of the pickup arm 70 into play-starting position on the record just lowered; also an opening of the incoming voltage supply mains to all electrical circuits after the last record to be played has been played and the pickup arm 70 has been returned for retainment in its normal retracted position, or optional repetitions in the playing of the last record to be played on the turntable 15. The latter performance requires the drop over lever 49 to be placed in the broken-line position of FIG. 1, and the former performance requires said lever to be placed in the solid-line position of FIG. 1. Both of these settings accomplish said results through their effect on the shaft 46. It also follows that to close all electrical circuits the drop over lever 49 is rotated to the broken-line position of FIG. 1, which must be performed anyway, in order to place records to be played between the spindle support ledge 21 and the record support platform 20.

Rotation of the shaft 84 which, by the movement its cams impart to their associated elements, thereby controls the performance of all the functions just mentioned, is itself electrically controlled, both automatically and manually, by interposition of masks 111, 115, 118, 123 and 129 between the light source bulb 110 and the photoelectric tube 113. Said masks, depending upon relative positioning of their apertures and masking surfaces at the instant, either cause impingement or interception of the light beam emanating from the light source bulb 110 to occur on the photoelectric tube 113, which thereby, by means of an electric control circuit shown in FIG. 24, respectively causes rotation of said shaft 84 to stop, or causes rotation of said shaft 84 to start. Rotation of the cam shaft 84 is transmitted from the motor 87 in said electric control circuit by means of friction wheels 86 and 85. The, automatic or manual, electric control of the rotation of the shaft 84 is timed to occur, as presently explained, at various exact predetermined instants, so that the corresponding intervals of movement thereby imparted, by the cams on the shaft 84 to their associated elements by such rotation of said shaft, will cause the performance of every one of the aforesaid many essential modern functions required for the automatic playing and changing of records.

Since electric control means to control, automatically or manually, every one of the many functions, necessary to the automatic playing and changing of records is the specific method used in this invention, a complete summary, at this point, presenting a description dealing exclusively with said electric control means, which includes the purpose of all the components, relied upon to control electrically, automatically or manually as required, every one of the mechanical functions necessary to perform automatic record playing and changing will be appropriate; and will also thereby provide a clearer, easier understanding of said electric control means as they appear, later on, in the step by step detailed description of the entire operation and functioning of the invention. In the following description of the electric control system, for simplicity and clarity, details of how the rotating shaft 84 mechanically determines the performance of the various functions, have been intentionally omitted, but will be described in complete detail in the detailed step by step description to follow.

Referring to FIGS. 3 and 5 for physical arrangement, it will be observed that a light beam from the light bulb 110 is focused upon the sensitive element of the photoelectric tube 113, through a slit 112 in the shield 111, said shield with its slit being separately shown in detail in FIG. 13. Impingement or interception of said light beam on the photoelectric tube 113 is achieved respectively by registry of, either the apertures or masking surfaces of the following interposed masking elements with said slit 112 in the light bulb shield 111, namely: the maintaining mask 115, the auxiliary mask 118, the end of play initiating mask 129, and the start-reject initiating mask 123. When the light beam, due to the relative positioning of the above mentioned masks, for the instant, is intercepted, by the masking surfaces of one or more of said masks, from the photoelectric tube 113, referring to FIG. 24, the thyratron tube 145 then, by means of the electric control circuit illustrated, is caused to discharge, with attendant current flow in the plate circuit of said tube, and with attendant starting of rotation of the D.C. motor 87. On the other hand, when said light beam, due to a change in positioning of said masks at some other instant, is permitted to pass through all the apertures of said masks, said beam will impinge on the photoelectric tube 113. Then by means of same said electric control circuit, illustrated in FIG. 24, the thyratron tube 145 is prevented from discharging, thereby preventing current in the plate circuit of said tube with attendant stopping of the D.C. motor 87. Referring to FIGS. 3 and 4, the D.C. motor 87 transmits rotation to the shaft 84 through the friction wheels 86 and 85. Hereinafter, for simplicity and clarity, in this summary which deals exclusively with the electric control system used, the method will be assumed to be understood whereby interception of the light beam from the photoelectric tube 113 causes attendant rotation of the shaft 84 by electric control means, and, on the other hand, impingement of the light beam on the photoelectric tube 113 causes the shaft 84 to stop rotating by electric control means, as has just been set forth.

A general description of the purpose of each of the masking elements, previously referred to, dealing exclusively with the electric control system, applied to this automatic record player and changer now follows.

The function of the masking shield 111, shown in detail in FIG. 13, is to focus a light beam, in the form of the slit 112, onto the sensitive element of the photoelectric tube 113.

The basic purpose of the maintaining mask 115, as shown in FIG. 14, since it is affixed to and therefore rotates with the shaft 84 which shaft determines the performance of all the functions involved, is to automatically govern the maintaining of electric control, so as to achieve full automatic record playing of the complete playing surface of a record and automatic record changing. In order to perform aforesaid governing, the maintaining mask serves as a means for maintaining light beam interception for a predetermined time interval, after beam interception has been initiated by either manual or automatic means. This is accomplished by timing each of the apertures 116 and 117 of the maintaining mask 115 as follows: referring to FIG. 7, the inner aperture 116 of said maintaining mask 115, when rotated into registry with the upper part of the slit 112 of the light bulb shield 111, is timed to occur at the same instant the pickup arm 70, by means of the accompanying movement of the mechanism, has just been placed upon the record on the turntable 15 in play-starting position relative to the record; referring to FIG. 10, the outer or pheripheral aperture 117 in the maintaining mask 115, when rotated into registry with the lower part of the slit 112 of the light bulb shield 111, is timed to occur at the same instant the pickup arm 70, by means of the accompanying movement of the mechanism, has been returned to its normal retracted position, as shown dotted in FIG. 1. Since the respective registry of said apertures 116 and 117, as just described, permits impingement of the light beam on the photoelectric tube 113 to occur at the respective instants just stated, thereby by electric control means shaft 84 rotation is, at the same respective instants, stopped automatically, and thereby, by means of the accompanying mechanism, said pickup arm 70 and all automatic record player and changer functioning is thereby also automatically stopped, in said respectively timed positions relative to said apertures 116 and 117, that have just been described. On the other hand, after light beam interception has been initiated by either the end of play initiating mask 129 or by the manual start-reject initiating mask 123, thereby by electric control means the shaft 84 rotates the respective aperture of the maintaining mask 115 away from registry with said slit 112 of the light bulb shield 111 and the light beam interception is thus maintained by the maintaining mask 115 until another aperture in the maintaining mask 115 is rotated into registry with said slit 112 of the light bulb shield 111. Thus the maintaining mask 115 governs maintaining of automatic electric control of the photograph record player and changer function.

The purpose of the auxiliary mask 118, shown in FIG. 15, is to govern electric control over the pickup arm 70 only at the time it is in its normal retracted position, shown dotted in FIG. 1. As aforementioned in connection with the maintaining mask 115, the pickup arm 70 is timed to automatically stop in its normal retracted position at the same instant, as illustrated in FIG. 10, when the outer aperture 117 of the maintaining mask 115 is in registry with the lower part of the slit 112 in the light bulb shield 111. However, as shown in FIG. 9, the interposition of the auxiliary mask 118 when said mask surface is in the raised position as illustrated, intercepts the light beam which would otherwise impinge upon the photoelectric tube 113, and thereby electric control means, rotation of the shaft 84 would continue automatically, so that, by means of the accompanying movement of the mechanism, the pickup arm 70 would not stop in its normal retracted position, but automatically continue to move and function in its automatic record playing and changing cycle. Thus the auxiliary mask 118, when raised as illustrated in FIG. 9, will permit, continuous, automatic record playing, but, on the other hand, when lowered, due to light impingement on the photoelectric tube 113, as illustrated in FIG. 10, will permit the pickup arm 70 and all automatic record player and changer functioning to automatically stop when said pickup arm 70 is in its normal retracted position, shown dotted in FIG. 1, after the playing of a record, as already pointed out hereinbefore in connection with the maintaining mask 115.

The purpose of the end of play initiating mask 129, FIG. 16, is to initiate an automatic record playing cycle, by automatic electric control means, at the time the pickup arm 70 has reached the end of play position on the record. Said end of play initiating mask 129, FIG. 16, which is a mechanically integral part of the pickup arm 70, accomplishes this, as shown in FIG. 8, by intercepting the light beam emanating from the inner aperture 116 of the maintaining mask 115, at the instant the pickup arm 70 has reached the end of play position on the record, and thereby through electric control means automatically causes the shaft 84 to start rotating. By the accompanying movement of the mechanism, the pickup arm 70 is caused to automatically leave playing engagement with the record to start movement in the automatic record playing and changing cycle.

The purpose of the start-reject initiating mask 123, FIG. 12, is, by manual means, to initiate automatic record playing and changing cycles, or to initiate the rejection or repetition of the playing of a record. The start-reject initiating mask 123 accomplishes this by manual means, referring to FIG. 6, when the masking end of said start-reject initiating mask 123 is in a raised position, achieved by manually depressing the press button 127, thereby intercepting the light beam emanating from either the inner aperture 116 or the outer aperture 117 of the maintaining mask 115. When the start-reject initiating mask 123 intercepts the light beam emanating from the outer aperture 117 of the maintaining mask 115, FIG. 6, thereby through electric control means the shaft 84 starts to rotate, and by the attendant movement of the mechanism, the pickup arm 70 leaves its corresponding position, i.e., the normal retracted position shown dotted in FIG. 1, and starts the record playing and changing cycle. Thus the start-reject initiating mask 123, in this case, serves as a manual starting means. As the start-reject initiating mask 123 intercepts the light beam when emanating from the inner aperture 116 of the maintaining mask 115, FIG. 11, through the electric control means, the shaft 84 is set into rotation and, due to the attendant movement of the mechanism, the pickup arm 70 is caused to leave its corresponding relative position of playing engagement with the record being played on the turntable 15, and start another record playing and changing cycle. Thus the start-reject initiating mask, in this case, serves as a manual rejection or repetition means.

A further, brief, composite explanation of the electric control of the automatic and manually-operable semiautomatic record playing and changing functions, which take place when the various masking elements are sequentially placed, as illustrated in FIGS. 6–11, in each of the required positions they assume for a corresponding normal record playing and changing cycle, will provide a still clearer idea of the underlying electric control principle used herein, and also aid in a clearer understanding of the complete operation of the apparatus to be described in step by step detail later on.

For simplicity and clarity, and to thereby avoid unnecessary repetition, in the following description of the masking elements as illustrated, it will be understood, as hereinbefore pointed out, that when the inner aperture 116 of the maintaining mask 115 is in registry with the slit 112 of the light bulb shield 111, the corresponding relative position of the pickup arm 70 is the play-starting position relative to the record, because it has been timed to be in said position; and when the outer aperture 117 of the maintaining mask 115 is in registry with the slit 112 of the light bulb shield 111 that the corresponding relative position of the pickup arm 70 is its normal retracted position, as shown dotted in FIG. 1, because it has been timed to be in said position.

FIG. 10 is the position of all masking elements just before initiation of a record playing and change cycle. Due to the registry of the outer aperture 117 of the maintaining mask 115 with the lower half of the slit 112 of the light bulb shield 111, the light beam impinges on the photoelectric tube 113 and thereby, through the electric control means, prevents the shaft 84 from rotating, and thereby, through the accompanying mechanism, the pickup arm 70 is retained in its corresponding relative normal retracted position as shown dotted in FIG. 1.

Figure 6:
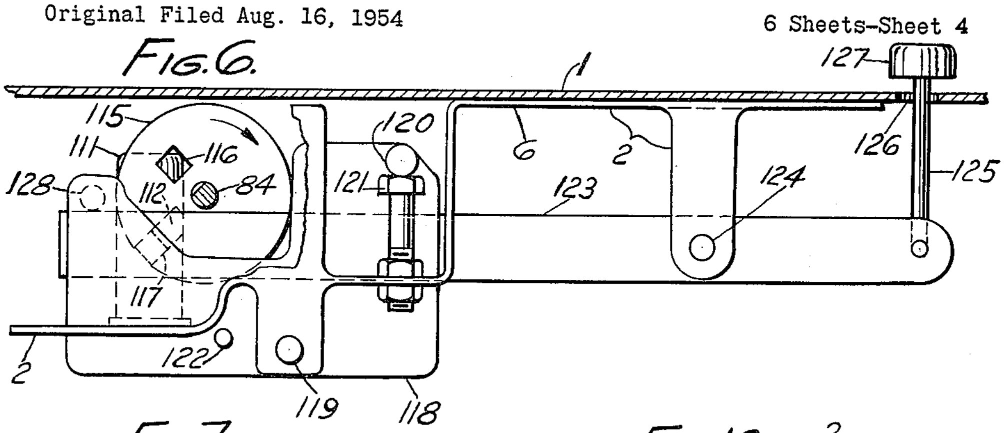
FIG. 6 is a fragmentary view in vertical section taken as indicated by the angled arrows VI—VI in FIG. 3.
Figures 7, 8, 9, 10, 11, 12, 13, 14, 15, 16:
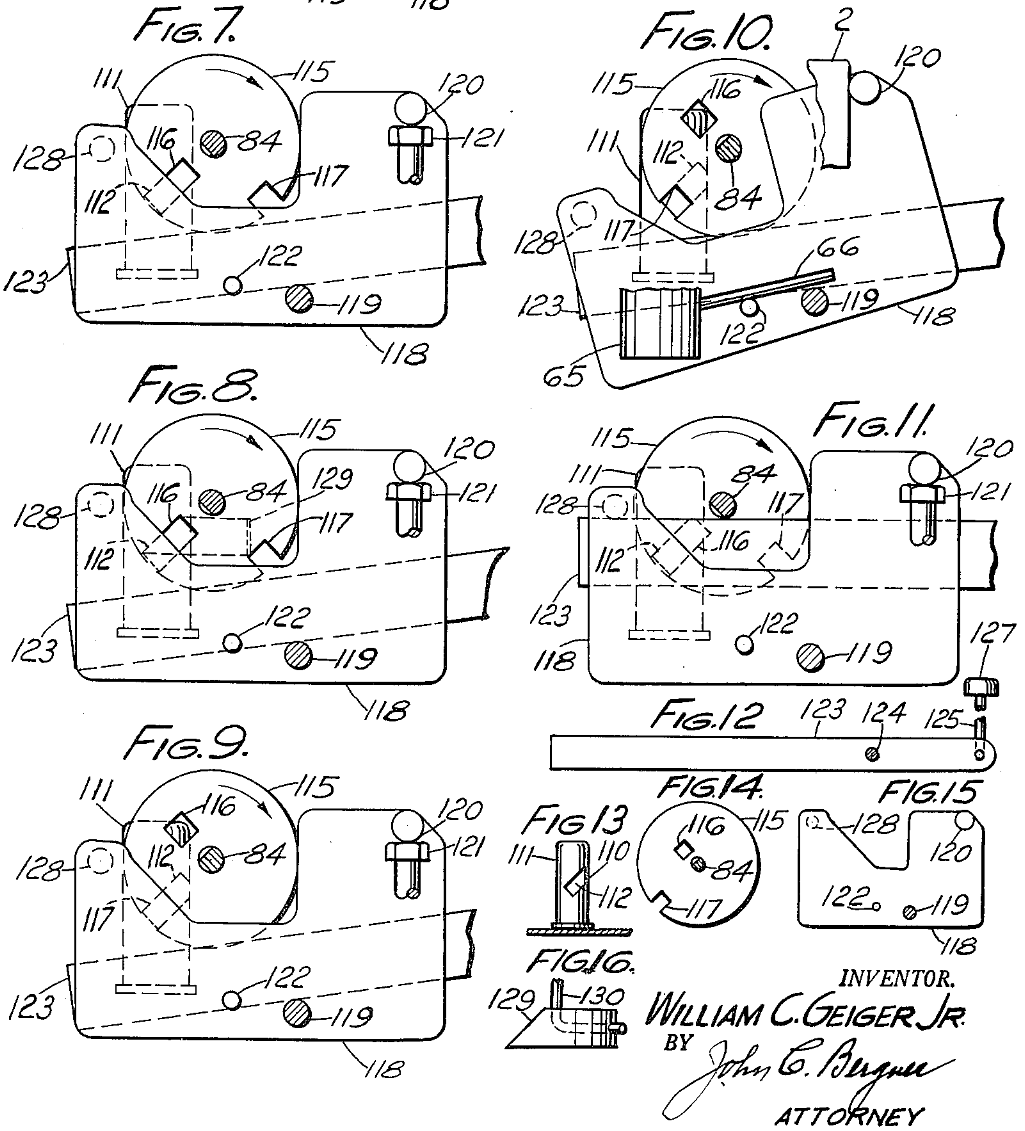
FIGS. 7, 8, 9, 10 and 11 are views like FIG. 6 but with the moving parts shown in different successive positions assumed by them during an operative cycle of the apparatus.
FIGS. 12, 13, 14, 15 and 16 are detail views of different component parts of the apparatus which will be specifically referred to hereinafter.
Figure 17:
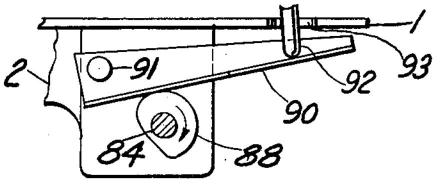
FIGS. 17, 18, 19, 20, 21 and 22 are detail sectional views taken as indicated respectively by the arrows XVII—XVII, XVIII—XVIII, XIX—XIX, XX—XX, XXI—XXI, and XXII—XXII in FIG. 5.
Figure 18:
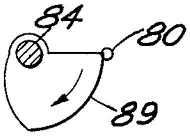
Figure 19:
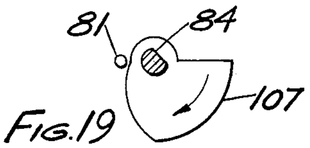

FIG. 6 is the same as FIG. 10 except that by manually depressing the press button 117 which is pivoted at 124, the masking end of the start-reject lever 123 and masking end of the auxiliary mask 118 (said auxiliary mask 118, due to contact of the upper edge of the masking end of the start-reject lever 123 with the lower edge of the auxiliary mask lug 128, has also been raised at the same time) have intercepted the light beam and prevented said beam from impinging on the photoelectric tube 113. This action through the electric control means causes the shaft 84 to rotate, whereby through the attendant movement of the mechanism, the pickup arm 70 is started in its movement from its corresponding relative normal retracted position, shown dotted in FIG. 1.

FIG. 7 shows the next rotative position of the maintaining mask 115, with the inner aperture 116 in registry with the upper portion of the slit 112 in the light bulb shield 111. The light beam thus impinging on the photoelectric tube 113, through the electric control means, causes the shaft 84, which has been rotating due to the maintaining of the light beam interception by the maintaining mask 115 after the light beam interception was initiated by the start-reject initiating mask, to automatically stop, and thereby, through the attendant movement of the mechanism, the pickup arm 70, as well as all other automatic record player and changer funtcioning, is caused to automatically stop when said pickup arm 70 has just been placed in its corresponding relative position to which it has just been moved, namely play-starting position relative to the record.

FIG. 8, the next position, shows all masking elements in the same position as in FIG. 7 except that another masking element, the end of play initiating mask shown in detail in FIG. 16, since the record has been played, has intercepted the light beam emanating through registering of the inner aperture 116 of the maintaining mask 115 and the upper half of the slit 112 in the light bulb shield 111, whereby through through the electric control means, the shaft 84 is again automatically started rotating, and consequently, through the attendant movement of the mecahnism, the pickup arm 70 is lifted and started in its movement from end of record play position. As illustrated in FIG. 3, this end of play mask 129 moves laterally with and forms a part of the pickup arm assembly and reaches the position shown in FIG. 8 only at the end of the record playing. The end of play initiating mask 129 never makes mecahnical contact with any other mechanical part at any time, which is in keeping with the objective maintained to keep the pickup arm 70 free of all external forces due to the automatic apparatus for moving the pickup arm means during the playing of a record and including all of the time the stylus is in contact with the record until the stylus is being lifted from contact with the record. Hence, after the playing of the final recorded sound, when the movement of the pickup arm is created solely by the terminal portion of the record groove, essential modern automatic record playing functions are individually performed even though the entire electric circuit means in which the sensing means is connected, and the sensing means which causes essential modern automatic functions, exert zero value of lateral force on all the lateral movement of the pickup arm which is created by the record groove. The new concept of the foregoing of this paragraph permits the many highly desirable results which have been set forth in the preceding summary of the invention in paragraphs 1–10 under paragraphs A1.

FIG. 9 shows the next position of the maintaining mask 115. In this rotative position of the maintaining mask 115, the outer aperture 117 has rotated into registry with the lower half of the slit 112 in the light bulb shield 111 due to the maintaining of the light interception by the maintaining mask 115 after the light beam interception was initiated by the end of play initiating mask 129. However, due to the raised position of the masking end of the auxiliary mask 118, the light beam is still intercepted from the photoelectric tube 113 so that, through the electric control means, the shaft 84 is automatically permitted to continue in rotation and, through attendant movement of the mecahnism, the pickup arm 70, which has just moved from the end of play position on the record to the corresponding relative normal retracted position shown dotted in FIG. 1, instead of remaining in this said normal retracted position continues to move as the maintaining mask 115 also maintains the light beam interception. Due to the shaft 84 rotation, as shown in FIG. 7 the inner aperture 116 of the maintaining mask 115 is rotated into registry with the slit 112 of the light bulb shield 111, and the light beam thus permitted to impinge upon the photoelectric tube 113, whereby through electric control means, the rotation of shaft 84 is then automatically stopped and, through the mechanism, the pickup arm 70, which had been moving, automatically stops upon arrival of the pickup arm in its relative corresponding play starting position relative to the record, and all other automatic record player and changing functioning are likewise also automatically stopped. The pickup arm 70 then either plays another record which, in the interval before the pickup arm 70 has been automatically placed into play-starting position relative to the record, has been released onto the turntable 15, or plays the same record over again, if there are no more unplayed records or naturally also in the case just a single record on the turntable is the only record for playing. This record playing cycle obviously will be repeated over and over again as long as the masking end of the auxiliary mask 118 remains in a raised position.

FIG. 10 is the same as FIG. 9 except that the masking end of the auxiliary mask 118 is lowered, and the light beam emanation allowed by the registry of the outer aperture 117 of the maintaining mask 115 with the lower half of the slit 112 of the light bulb shield 111 is permitted to reach the photoelectric tube 113 and, through the electric control means, to automatically stop the rotation of the shaft 84. Through the associated mechanism, the pickup arm 70 is automatically stopped in its relative corresponding normal retracted position, as shown dotted in FIG. 1, as well as all other automatic record player and changer functioning. Obviously, this lowered position of the auxiliary mask 118 is in effect only after the last, which naturally may be the only, record to be played has been played. The method whereby the masking end of the auxiliary mask 118 is automatically raised or lowered to achieve optional repetition or shut-off after the last record has been played is effected by placement of the drop over lever 49, FIG. 1, and will be more fully described in detail later on.

FIG. 11 shows the position of the maintaining mask 115 when the inner aperture 116 is in registry with the slit 112 in the light bulb shield 111, as shown in FIG. 7, except that the masking end of the start-reject lever 123 is raised by depressing the press button 127, and the light beam which had been impinging on the photoelectric tube 113 is intercepted and, through the electric control means shaft 84 is started in rotation. Thus through attendant movement of the mechanism, the pickup arm 70 whereof the corresponding relative position is in playing engagement upon a portion of the playing surface of the record, is lifted from the record and returned to the normal retracted position, shown dotted in FIG. 1, due to maintaining of the light beam interception by the maintaining mask 115. However, at this point, due to the raised position of the masking end of the auxiliary mask 118, the light beam is maintained intercepted at the corresponding relative position of registry of the outer aperture 117 of the maintaining mask 115 with the slit 112 of the light bulb shield 111 and, through the electric control circuit, the shaft 84 continues to rotate. By attendant movement of the mechanism, the pickup arm 70 therefore continues to move and is eventually placed into play starting position relative to the next record, at the time the inner aperture 116 of the maintaining mask 115 has again returned to the corresponding relative position of registry with the upper half of the slit 112 in the light bulb shield 111 and maintaining of light beam interception by the maintaining mask 115 is stopped, as shown in FIG. 7, and due to the light beam thus impinging on the photoelectric tube 113, through the electric control means, shaft 84 rotation is automatically stopped. At the same time, through the mechanism, the pickup arm 70 is automatically stopped in its corresponding relative play-starting position relative to the record, as are all other automatic record player and changer functioning. Incidentally, if there are no unplayed records to be released to the turntable 15, then the pickup arm 70 will lower into play-starting position relative to the same record on the turntable 15, in the manner just described, and play this record over again. Also, if the apparatus does not include a record changing mechanism then obviously the pickup arm 70 will lower into play-starting position relative to the record on the turntable 15, in the manner described, and play the record over again.

The description to follow is the step by step detailed description which has been hereinbefore referred to.

If omitted at any point in the ensuing step by step detailed description it will be assumed to be understood, as set forth in the electric control description, that the inner aperture 116 of the maintaining mask 115 is in registry with the upper portion of the slit 112 in the light bulb shield 111 at the same time the pickup arm 70 is in the corresponding relative position of play-starting relative to the record to be played or in any other position wherein the stylus of the pickup arm 70 is in contact with the record being played, and the outer aperture 117 of the maintaining mask 115 is in registry with the lower portion of the slit 112 in the light bulb shield 111 at the same time the pickup arm 70 is in the corresponding relative position, namely normal retracted position, as shown dotted in FIG. 1.

Since the method whereby interception of the light beam from the photoelectric tube 113 causes attendant rotation of the shaft 84 by electric control means and, on the other hand, impingement of the light beam on the photoelectric tube 113 causes the shaft 84 to stop rotating by electric control means, has been set forth in the description dealing exclusively with electric control, for simplicity and clarity, it will also be assumed to be understood in this step by step detailed description.

Figures 20, 21:
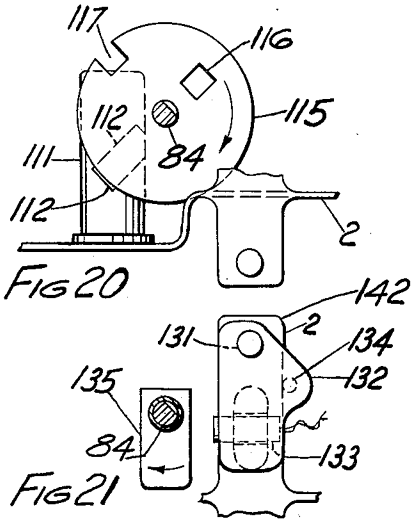
Figure 22:
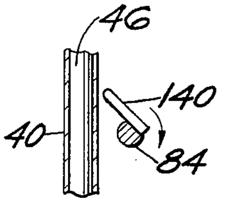

In preparation for the operation of the apparatus, the drop over lever 49 is lifted and swung clockwise from the normal position in which it is illustrated in FIG. 1, thereby turning the shaft 46 to which it is connected and causing the finger 66 on the weight collar 65 at the bottom of said shaft to ride leftward in FIG. 5 over the sloping edge 67 of the plate cam 68 until it engages the left leg of the element 138 to shift the latter in the same direction. Due to being connected to the element 138, the cam arm 135 is correspondingly shifted along the shaft 84 until stopped against the confronting edge of the cam arm 140. The arm 135 is thus withdrawn from the mercury switch supporting element 132 which is thereby released to swing down to vertical position by gravity as in FIG. 21, until stopped by engagement of the projection 134 thereon with the part 142 of the foundation frame 2. In this new position, the mercury switch 133 closes the circuits (FIG. 24) in which the turntable driving motor 22, the light bulb 110, the user's amplifier 150 and the primary of the transformer 146 are interposed, with the incidental initiation of turntable rotation. The record platform 20 is next manually turned about the shaft 46 in accordance with the size records to be played. In FIGS. 1 and 2, it has been adjusted with the edge 59 thereof in concentric relation to the center post 16, and with the push-off stud 56 positioned for medium size or ten inch records. By virtue of connection of the record platform 20 to the tubular shaft 40, said shaft is turned with the platform. As a consequence, through the arm 43 at the bottom end of the tubular shaft 40, the link rod 100 and the yoke 98, the sleeve 95 is shifted along the shaft 84 until the ball 108 engages the circumferential groove 105 in said shaft. In this way and by this means, the record platform 20 is accurately set and held in the position of FIG. 1, and the index cam 107 on the sleeve 95 is accurately positioned to determine subsequent swinging of the pickup arm 70 inwardly to play-starting position relative to the record in which it is shown in solid-line in FIG. 1, for the ten inch records, as will be presently explained. The record or records R to be played are next impaled over the upper end of the center post 16 down to the shoulder 21, with the edge of the lowermost record in the pile resting on the platform 20, whereupon the drop over lever 49 is turned back to the full line position of FIG. 1. In the meantime the thyratron tube 145 has warmed up, and all being now in readiness, the start-reject button 127 is depressed manually as in FIG. 6. The masking end of the lever 123 in being thereby raised, intercepts the light beam emanating from the bulb 110 through the slit 112 in the shield 111 and the outer aperture 117 in the maintaining mask 115, which, and the auxiliary mask 118, at this time, occupy the normal or starting positions in which they are shown in FIG. 6. The light beam from the bulb 110 is thus prevented from reaching the photoelectric tube 113. As a consequence, through the electric control means, the shaft 84 starts to rotate. Upon release of the start-reject button 127, the lever arm 123 will return by gravity to the normal position of FIG. 9. However, as illustrated in FIG. 9, the masking end of the auxiliary mask 118 remains upward and in addition the rotating maintaining mask 115 continues to maintain the interception of the light beam to prevent the light beam from reaching the photoelectric tube 113. This new position the auxiliary mask 118 assumes is due to contact of the upper edge of the masking end of the start-reject lever 123 with the lower edge of the auxiliary mask lug 128 at the time the start-reject lever 123 was raised, which thereby caused the masking end of the auxiliary mask 118 to assume a raised position, and then stay in said position due to the counterbalance weight 120 of said auxiliary mask 118 remaining on the stop screw 121, by reason of over center gravity. As the shaft 84 begins to rotate, the push off cam arm 140 is the first to function, and by its engagement with the tubular shaft 40 rocks the latter about the spherical bearing 41 against the restraining force of the spring 141, the record platform being thereby moved to displace the record R from the shoulder 21 of the center post 16 for release to drop onto the turntable 15. With continued rotation of the shaft 84, the index cam 107 next acts upon the finger 81 of the disk 79 on the fulcrum shaft 72 of said pickup arm to swing it inward from the normal broken-line retracted position in FIG. 1, to the full-line position wherein the stylus of said pickup arm is elevated directly above play starting position relative to the record R on the already revolving turntable 15. During the last described movement of the pickup arm 70, the extent of which was determined by pre-setting of the sleeve 95 of the index cam 107, the stud 92 on said pickup arm was slidingly supported by the wing extension of the cam follower lever 90 in a manner readily understood from FIG. 3. It is to be noted that the index cam 107 holds its contact pressure with the rod 81 due to a very slight inclination of the cam follower lever 90, see FIG. 5, and friction. While not great enough to cause sliding at any time between the pin 92 and the lever 90 as the inclination is very slight, the inclination plus the friction between these parts serves to hold the finger 81 against the index cam 107. Upon arrival of the pickup arm 70 in the position wherein the stylus of said pickup arm is elevated directly above play-starting position relative to the record on the turntable 15, the cam follower lever 90 is permitted to recede as the high portion of the lift cam 88 passes from beneath it as the shaft 84 continues to rotate further with attendant lowering of the pickup arm 70, for contact of the stylus of the latter into playing engagement with the record in play-starting position relative to the record on the revolving turntable. Attention is here directed to the fact that the configuration of the lift cam 88 is such as to allow further recession of the cam follower lever 90, so as to be well below and therefore out of engagement with the pin 92. Accordingly, and as is apparent from play-starting position of the pickup arm 70 in FIG. 3, which position is at the beginning of the record playing surface, and as obviously also exists regardless of the position of the index cam 107 for the starting of the playing of any diameter of record selected to be played; it is pointed out that: the pickup arm 70, as well as any part such as said pin 92, the finger projection 81, the finger projection 80, and the end of play mask 129, which forms a part of the pickup arm and which also moves therewith during the playing of a record, is disposed so that it is maintained entirely in spaced relationship to all of the mechanically fabricated structure of the entire automatic apparatus which is used for controlling and providing its movement, within the time from when the pickup arm has been positioned to place the stylus in contact with the record in play-starting position at the start of the record and the record groove is moving the pickup arm, until the time when the stylus of the pickup arm is being removed from contact with the record after the playing of the final recorded sound. This is in keeping with the objective maintained to keep the pickup arm means, which includes the pickup arm 70 and any part which forms a part thereof and which is also moved therewith, during the entire said record playing time, free of all forces by, or because of, any of the automatic apparatus which is used for moving the pickup arm means, in the automatic and in the manually-operable semi-automatic playing of records. In the preceeding summary of the invention, the operating characteristic thus afforded is set forth in paragraphs A1, and the many highly desirable results thus afforded are also set forth in paragraphs 1–10 under the paragraphs A1. It is to be understood that the pickup arm mass is selected so that the very small inertia of any of the parts which are affixed to a movable part of the pickup arm assembly would be included as a small portion of the total required pickup arm inertia for obtainment of the desired low frequency resonance of the arm. Accordingly, in effect the relatively very small inertia of said parts would not be added inertia to the pickup arm but would be pickup arm inertia. As shown in FIG. 7, at the time the shaft 84 has been rotated to the extent just mentioned, registry of the inner aperture 116 in the maintaining mask 115 with the upper part of the slit 112 in the shield about the bulb 110 occurs and the light beam is allowed to impinge upon the photoelectric tube 113 whereby, through the electric control means, the rotation of the shaft 84 ceases. Consequently, all automatic record player and changer functioning is stopped.

At the end of the record playing, the end of play initiating mask 129 (FIG. 16) is moved to the position shown in FIG. 8 into eclipsing relation to the aperture 116 in the maintaining mask 115, thereby initiating interception of the light beam. Under these conditions, through the electric control means, the shaft 84 starts to rotate. By the time the end of play initiating mask 129 has moved from the aperture 116 in the maintaining mask 115, the maintaining mask 115 has already turned to such an extent that the aperture 116 in said maintaining mask has passed registry with the slit 112 in the light bulb shield 111, but now the masking surface of the rotating maintaining mask 115 thereby continues to maintain the interception of the light beam to prevent the beam from reaching the photoelectric tube 113, whereby, through the electric control means, the shaft 84 continues to rotate. As the shaft 84 begins to rotate, the lift cam 88 functions to actuate the cam follower lever 90 and thereby cause the pickup arm 70 to be raised from playing relation to the record on the turntable 15. While the pickup arm 70 is thus temporarily held raised by the lift cam 88, the return rotation cam 89 comes into operation and, by its action upon the finger 80 of the disk 79 on the fulcrum shaft 72 of the pickup arm 70, said pickup arm is moved back to its normal retracted position in FIG. 1. If there are more records on the platform 20, the above cycle is repeated over and over again until all of them have been played. This repetition of the record playing, if there are more records on the record platform, as in FIG. 2, is due to the drop over lever 49, being retained in the solid-line raised position by the record or the records R, instead of being lowered to the dotted-line position, which takes place when the last record on the spindle support ledge 21 is lowered to the turntable 15.

Said raised position of said lever 49 thereby also prevents the occurrence of the subsequent lowering action of the masking end of the auxiliary mask 118, which does take place when the drop over lever 49 lowers to the broken-line position of FIG. 2. Thus, due to the consequent raised position of the masking end of the auxiliary mask 118, as in FIG. 9, the emanating light beam, due to the registry of the outer aperture 117 in the maintaining mask 115 with the lower portion of the slit 112 in the light bulb shield 111 at the time the pickup arm 70 is in its corresponding normal retracted position, is intercepted from the photoelectric tube 113. Under this condition, as the maintaining mask 115 also maintains the light beam interception, through the electric control means, the shaft 84 continues to rotate and, by the means just described, the pickup arm 70 is placed into play-starting position upon the next record, and the cycle, as aforementioned, is repeated over and over again until all of the other records have been played.

Now if the drop over lever 49 has been placed over the record or records placed upon the platform 20 as shown in the solid-line position of FIG. 1 then, upon release of the last record onto the turntable 15, the drop over lever will fall by gravity to the position in which it has been shown in dash and dot lines in FIG. 2, with consequent registry of the vertical portion of the upper slot 51 in said lever with the pin 47 in the shaft 46. In this event, the shaft 46 would also drop and the finger 66 of the weight collar 65 at the lower end of said shaft would glide down the angular notch 69 in the plate cam 68, in a manner which will be readily understood by reference to FIG. 5. By action of the finger 66 upon the projection 122 of the auxiliary mask 118, said mask is moved downward about its fulcrum 119 as in FIG. 10, until intercepted by engagement of its counterbalancing weight projection 120 with the stop portion of the foundation frame 2. As a consequence of the turning movement imparted to the shaft 46 as the finger 66 slides down the slit 69 in the stationary cam 68, said finger, by acting upon the suspension element 138 will move the latter to the right on the shaft 84 and thereby bring the cam arm 135 into the plane of the plate 132 which carries the mercury switch 133, to subsequently actuate said plate 132. The actuation of the plate 132 does not take place until after the shaft 84 has rotated as necessary for return of the pickup arm 70 to its normal retracted position shown in broken-lines in FIG. 1, after the playing of the last, which naturally may be the only, record to be played has been played. At this time, the rotation of the shaft 84 performs two functions concurrently. The cam arm 135 has rotated into contact with the plate 132 and caused said plate 132 to rotate about its pivot and assume an inclined position, thereby tilting the mercury switch 133 to the angle which opens the circuits (FIG. 24) in which the primary of the transformer 146, the user's amplifier 150, the light bulb 110 and the turntable motor 22 are interposed. Also, at the same time, as in FIG. 10, the light beam emanating from the registry of the outer aperture 117 in the maintaining mask 115 with the slit 112 of the light bulb shield 111, at a time when the auxiliary mask 118 is lowered as has just been described, falls upon the photoelectric tube 113. This action of the light beam on the photoelectric tube 113, at the same time all the electrical circuits are opened, of course as hereinbefore explained in the explanation of FIG. 10 stops the rotation of the shaft 84 and the pickup arm 70 in its relative corresponding normal retracted position shown dotted in FIG. 1, and it also makes possible the preparation for again operating the apparatus, as hereinbefore described, by rotating the drop over lever 49 clockwise to the position shown in broken lines in FIG. 1 and thereby closing all electrical circuits, to take place without any attendant operation of the motor 87 and the shaft 84 taking place, until the start-reject button 127 is depressed, as shown in FIG. 6, to intercept the light beam.

On the other hand, referring to FIGS. 1 and 5, if the drop over lever 49 had not been swung over the turntable 15 but was retained in the broken line position as shown in FIG. 1, the finger 66 on the weight collar 65 would be retained leftward on the sloping edge 67 of the plate cam 68 and would thereby retain the element 138 and the connected cam arm 135 leftward against the confronting edge of the cam arm 140. Since the cam arm 135 would then be out of the plane of the plate 132 which supports the mercury switch 133, upon rotation of the shaft 84 there would never be contact made by the cam arm 135 with said plate so that all electrical circuits will remain closed even after the last, which naturally may be the only, record to be played was played. Moreover, since the finger 66 on the weight collar 65 would be retained leftward on the sloping edge 67 of the plate cam 68, said finger would be held above projection 122 of the auxiliary mask 118. The auxiliary mask 118 would therefore remain indefinitely in raised position as in FIG. 9 even after the playing of the last, which naturally may be the only, record to be played has been played, and prevent the light beam from reaching the photoelectric tube 113 on each rotation of the maintaining mask 115, at the time when the outer aperture 117 is in registry with the lower portion of the slit 112 in the light bulb shield 111, this occurring at the instant the pickup arm 70 is in its corresponding relative normal retracted position, as shown dotted in FIG. 1. Therefore, due to interception of the light beam at this stage, through the electric control means, the shaft 84 continues to rotate and the pickup arm 70 does not stop in its retracted position but functions in its normal automatic record playing cycle so that the last, which naturally may be the only, record to be played is played over and over again. If, after a time, it is desired to stop the apparatus, the drop over lever 49 is turned counterclockwise, in FIG. 1, to the solid-line position, and the action hereinbefore described to stop the change cycle for this position of the drop over lever 49 takes place, and all electrical circuits are opened. If after turning the drop over lever 49 counterclockwise, as mentioned, it is further desired to stop the change cycle immediately, before completing the play of the last, which naturally may be the only, record to be played, the start-reject button 127 is depressed. As shown in FIG. 11, the light beam emanating from the registry of the inner aperture 116 in the maintaining mask 115 with the upper portion of the slit 112 in the light bulb shield 111 is thereby intercepted by the masking end of the start-reject lever 123, from the photoelectric tube 113 whereby, through the electric control means, the shaft 84 starts rotation. Upon release of the start-reject button 127, the masking end of the lever 123 is lowered from eclipsing relation with said light beam. However, due to the shaft 84 rotation, the inner aperture 116 in the maintaining mask 115 has passed registry with the slit 112 of the light bulb shield 111, but at this time interception of the light beam is maintained by the masking surface of the rotating maintaining mask 115 which thereby continues to maintain the interception of said light beam from reaching the photoelectric tube 113. As a consequence, through the electric control means, the shaft 84 continues to rotate. The pickup arm 70 will then be lifted and retracted as previously explained. However, in this instance upon release of the start-reject button 127, the auxiliary mask 118 is immediately lowered by the finger 66 on the weight collar 65, which now, for this position of the drop over lever 49, rests on top of the projection 122 of the auxiliary mask 118, and again lowers said mask. As before, the lowered auxiliary mask 118 causes the pickup arm 70 to stop in its retracted position shown dotted in FIG. 1 and, as previously pointed out, due to the action of the cam arm 135 for this counterclockwise position of the drop over lever 49, all electrical circuits are opened at the same time. From this possible variation in the position of the drop over lever 49 it will be seen that this automatic record playing and changing apparatus provides for optional automatic shut off after the last, which naturally may be the only, record to be played has been played.

If during the playing of any record, it is desired to reject such record before it has been completely played, the start-reject button 127 is depressed and, as shown in FIG. 11, interception of the light beam from the inner aperture 116 in the maintaining mask 115 is initiated by the masking end of the lever 123. Under this condition, through the electric control means, the shaft 84 starts to rotate and the record change cycle is initiated, likewise as previously described. Upon release of the start-reject button 127, the masking end of the lever 123 is lowered from the light beam emanating from the inner aperture 116 in the maintaining mask 115, but due to the rotation of the shaft 84, by this time the maintaining mask 115 has turned to such an extent that the inner aperture 116 therein has passed registry with the slit 112 in the light bulb shield 111. However, interception of the light beam by the masking surface of the rotating maintaining mask 115 now takes over and thereby continues to maintain the interception of the light beam to prevent said beam from reaching the photoelectric tube 113. Thus, through the electric control means, shaft 84 continues to rotate. A change cycle is thus initiated which from here on, is the same as the cycles which take place when the end of play initiating mask 129 intercepts the light beam in a manner already understood. Thus it will be seen that the manually-operable semi-automatic rejection of records, and naturally manually-operable semi-automatic repetition when just a single record is played, is easily accomplished with this automatic record playing and changing apparatus.

From the conditions described in the operation, wherein it has been shown that the pickup arm 70 does not make contact with any external mechanical elements during any portion of the playing of the record, it will also be seen that successful cuing or selective manual playing of portions of any individual record is possible, by manual lifting and lowering of the pickup arm 70, without causing automatic functioning.

When large or twelve inch records are to be played, the platform 20 is turned counterclockwise from the position of FIG. 1 to bring the curved edge portion 60 thereof into concentric relation to the axis of the turntable 15 for functioning of the stud 57 in the push off. By incidental turning of the tubular shaft 40 to which the platform 20 is affixed, the sleeve 95 is shifted leftward on the shaft 84, in FIGS. 3 and 5, through the link rod 100 and yoke 98, and the ball 108 caused to engage the groove 104 in said shaft 84. In this way, as shown in FIG. 3, the index cam 107 is positioned for impartation, through the finger projection 81 extending from the disk 79 on the shaft 72 of the pickup arm 70, of less inward movement to said pickup arm as required to bring it into play-starting position relative to and for the twelve inch records.

Figure 23:
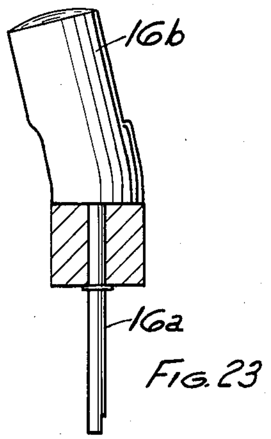
FIG. 23 is a detail view of another component part of the apparatus which will also be specifically referred to hereinafter.

To adapt the apparatus for the playing of small standard seven inch records, having large center holes, there is provided the post or spindle 16*a* illustrated in FIG. 23, which is substituted in place of the usual spindle 16, illustrated in FIGS. 1 and 2. As shown, the substitute spindle 16*a* has an inclined head portion 16*b* of a diameter to fit the holes of the small records. The apparatus is prepared for the playing of the small records by turning the platform 20 clockwise from the position of FIG. 1, to bring the curved edge portion 58 thereof into concentric relation to the axis of the turntable 15, for functioning of the stud 55 in the push off. Through incidental movement of the tubular shaft 40, the link rod 100 and the yoke 98, the sleeve 95 of the index cam 107 is shifted to the right on the shaft 84, in FIGS. 3 and 5, and the ball 108 thereby engaged with the groove 106 in the latter shaft. The index cam 107, FIG. 3, is thereby definitely positioned to impart through the finger 81, of the disk 79 on the fulcrum shaft 72 of the pickup arm 70, a greater inward swing to said pickup arm, as required for play-starting position relative to and for the small records.

The operation of the apparatus for both the larger and the smaller records is otherwise exactly the same as hereinbefore described for the playing of records of the intermediate or ten inch size.

Figure 25:
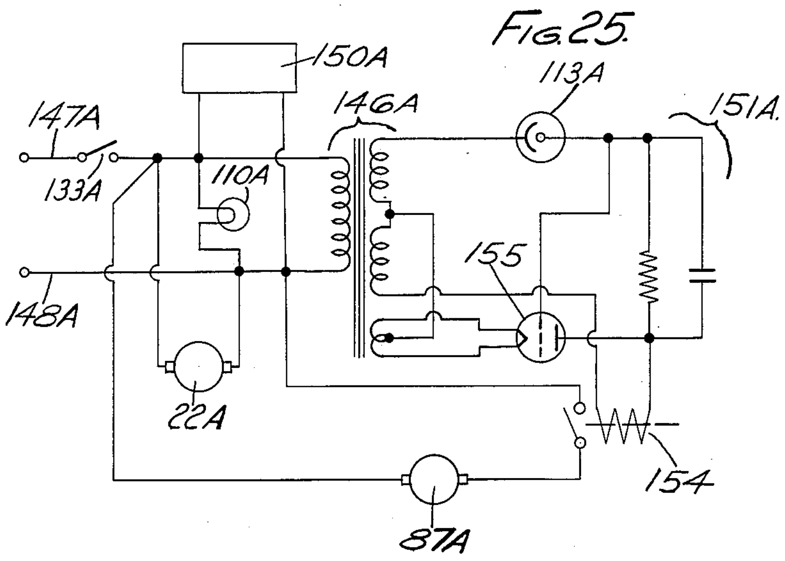
FIG. 25 is a view similar to FIG. 24 showing an alternative embodiment.

In FIG. 25 of the drawings, it is shown how an A.C. motor 87A can be used instead of the D.C. motor 87 of the first described embodiment to drive the shaft 84, said A.C. motor being connected across the power mains 147A and 148A, like the turntable driving motor 22A, but with interposition of a relay 154. In this case, an amplifying tube 155 is employed in lieu of a thyratron to amplify the impulses received from the photoelectric tube 113A for actuation of the relay 154, by which the current flow through the circuit of the motor 87A is controlled. The network 151A is suitably connected in circuit with the secondary of the transformer 146A for the purposes of this invention.

This invention is not to be considered as limited to the precise details of construction herein shown and described by way of example since these may obviously be varied within the scope of the broader of the appended claims as will be readily apparent to those skilled in the art.

What is claimed is as follows:

1. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the stylus is in a portion of the record groove substantially after the playing of the final recorded sound to provide movement of the pickup arm means to a predetermined position in which the stylus is entirely removed from contact with the record, and means included in said operating means for maintaining the movement of the pickup arm means after it has been started and for automatically causing the movement of the pickup arm means to stop when the pickup arm means arrives at said predetermined position wherein the stylus is entirely removed from contact with the record; said pickup arm means including a cooperative means which moves laterally with the pickup arm means during the playing of a record on the turntable means; a sensing means being so disposed is relation to said cooperative means that the sensing means senses, and is also thereby operated by, only the relative movement of said cooperative means with respect to said sensing means which is provided by only the movement of said pickup arm means which is created solely by the portion of the record groove substantially after the playing of the final recorded sound; a connection means which so connects the sensing means to said operating means that said operating means acts on said pickup arm means to provide movement of the pickup arm means in response to said sensing by the sensing means, both said connection means and said sensing means being supported apart from said pickup arm means; said sensing means being operable while both said connection means and said sensing means are so disposed in relation to said pickup arm means that both said connection means and said sensing means exert zero value of lateral force on all the lateral movement of the pickup arm means which is created by the record groove during all the time the stylus is in contact with the record groove in the playing of a record; such sensing by the sensing means and said resultant operation of the sensing means, through said connection means, causing operation of said operating means to move the pickup arm means to said predetermined position wherein the stylus is entirely removed from contact with the record, and, by said means included in said operating means, the movement of said pickup arm means to be automatically stopped when the pickup arm means arrives in said predetermined position wherein the stylus is entirely removed from contact with the record.

2. The sound reproducing apparatus set forth in claim 1, wherein said sensing means is a photoelectric sensing means and wherein said photoelectric sensing means includes a photocell means and means for providing a light beam, and wherein the entire said photocell means and the entire said means for providing a light beam are, in their entirety, disposed entirely in spaced relationship to said entire pickup arm means during all the time the stylus is in contact with any of the groove on a record.

3. The sound reproducing apparatus set forth in claim 2, wherein the entire said operating means is, in its entirety, disposed to be entirely in spaced relationship to the entire pickup arm means during all the time the stylus is in contact with, and is being moved laterally by, the groove on the record in the playing of the record, until the stylus is being lifted from contact with the record by the operating means at the playing of the final recorded sound.

4. The sound reproducing apparatus set forth in claim 3, wherein said movement of the pickup arm means by the operating means, to a predetermined position wherein the stylus is entirely removed from contact with the record, is to a predetermined position wherein the pickup arm means is also laterally removed from above the record.

5. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the stylus is in a portion of the record groove substantially after the playing of the final recorded sound to provide movement of the pickup arm means to a predetermined position in which the stylus is entirely removed from contact with, and the pickup arm means is laterally removed from above, the record and to then provide movement of the pickup arm means on to play-starting position at the start of a record on the turntable, and means included in said operating means for automatically maintaining said movement of the pickup arm means, after it has been started, to said predetermined position wherein the stylus is entirely removed from contact with, and the pickup arm means is laterally removed from above, the record and then on to play-starting position at the start of a record; said pickup arm means including a cooperative means which moves laterally with the pickup arm means during the playing of a record on the turntable means; a sensing means being so disposed in relation to said cooperative means that the sensing means senses, and is also thereby operated by, only the relative movement of said cooperative means with respect to said sensing means which is provided by only the movement of said pickup arm means which is created solely by the portion of the record groove substantially after the playing of the final recorded sound; a connection means which so connects the sensing means to said operating means that said operating means acts on said pickup arm means to provide movement of the pickup arm means in response to said sensing by the sensing means, both said connection means and said sensing means being supported apart from said pickup arm means; said sensing means being operable while both said connection means and said sensing means are so disposed in relation to said pickup arm means that both said connection means and said sensing means exert zero value of lateral force on all the lateral movement of the pickup arm means which is created by the record groove during all the time the stylus is in contact with the record groove in the playing of a record; such sensing by the sensing means and said resultant operation of the sensing means, through said connection means, causing operation of said operating means to, through said means included in said operating means, automatically move the pickup arm means to said predetermined position wherein the stylus is entirely removed from contact with, and the pickup arm means is laterally removed from above, the record and then on to play-starting position at the start of a record on the turntable.

6. The sound reproducing apparatus set forth in claim 5, wherein said sensing means is a photoelectric sensing means and wherein said photoelectric sensing means includes a photocell means and means for providing a light beam, and wherein the entire said photocell means and the entire said means for providing a light beam are, in their entirety, disposed entirely in spaced relationship to said entire pickup arm means during all the time the stylus is in contact with any of the groove on a record.

7. The sound reproducing apparatus set forth in claim 6, wherein the entire said operating means is, in its entirety, disposed to be entirely in spaced relationship to the entire pickup arm means during all the time the stylus is in contact with, and is being moved laterally by, the groove on the record in the playing of the record, until the stylus is being lifted from contact with the record by the operating means at the playing of the final recorded sound.

8. In sound reproducing apparatus, in combination: a pickup arm means for a sound pickup means having a stylus, for use with a rotary turntable means having a turntable motor means for rotating the rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for deenergizing the turntable motor means substantially after the playing of the final recorded sound on the record, said operating means including turntable motor connection means to connect said operating means to the turntable motor means; said pickup arm means including a cooperative means which moves laterally with the pickup arm means during the playing of a record on the turntable means; a sensing means being so disposed in relation to said cooperative means that the sensing means senses, and is also thereby operated by, only the relative movement of said cooperative means with respect to said sensing means which is provided by only the movement of said pickup arm means which is created solely by the portion of the record groove substantially after the playing of the final recorded sound; a sensing connection means which so connects the sensing means to said operating means that said operating means, through said turntable motor connection means, causes deenergization of the turntable motor means in response to said sensing by the sensing means, both said sensing connection means and said sensing means being supported apart from said pickup arm means; said sensing means being operable while both said sensing connection means and said sensing means are so disposed in relation to said pickup arm means that both said sensing connection means and said sensing means exert zero value of lateral force on all the lateral movement of the pickup arm means which is created by the record groove during all the time the stylus is in contact with the record groove in the playing of a record; such sensing by the sensing means and said resultant operation of the sensing means, through said sensing connection means, causing operation of the operating means to, through said turntable motor connection means deenergize the turntable motor means and thereby stop rotation of the rotary turntable means.

9. The sound reproducing apparatus set forth in claim 8, wherein said sensing means is a photoelectric sensing means and wherein said photoelectric sensing means includes a photocell means and means for providing a light beam, and wherein the entire said photocell means and the entire said means for providing a light beam are, in their entirety, disposed entirely in spaced relationship to said entire pickup arm means during all the time the stylus is in contact with any of the groove on a record.

10. In sound reproducing apparatus, in combination: a pickup arm means for a sound pickup means having a stylus, for use with a rotary turntable means having a turntable motor means for rotating the turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for actuating on said pickup arm means when the stylus is in a portion of the record groove substantially after the playing of the final recorded sound and providing a predetermined movement of the pickup arm means; a control motor means connected to said operating means for driving the operating means; an electric circuit means; a sensing means; said control motor means and said sensing means being connected in said electric circuit means, and said control motor means being energized, through said electric circuit means, when the sensing means is operated; said pickup arm means including a cooperative means which moves laterally with the pickup arm means during the playing of a record on the turntable means; said sensing means being so disposed in relation to said cooperative means that the sensing means senses, and is also thereby operated by, only the relative movement of said cooperative means with respect to said sensing means which is provided by, only the movement of said pickup arm means which is created solely by the portion of the record groove substantially after the playing of the final recorded sound; both said sensing means and said electric circuit means being supported apart from said pickup arm means; said sensing means being operable while both said electric circuit means and said sensing means are so disposed in relation to said pickup arm means that both said electric circuit means and said sensing means exert zero value of lateral force on all the lateral movement of the pickup arm means which is created by the record groove during all the time the stylus is in contact with the record groove in the playing of a record; such operation of the sensing means, through said electric circuit means, causing operation of the control motor means to drive said operating means to act on said pickup arm means and provide said predetermined movement of the pickup arm means; the entire said control motor means, the entire said operating means, and the entire said electric circuit means each being so related to both the rotary turntable means and the turntable motor means for rotating the rotary turntable means that the entire said control motor means, the entire said operating means, and the entire said electric circuit means is each operable completely in the full performance of its said function while being, at all times, disposed entirely in spaced relationship to both the rotary turntable means and the turntable motor means for rotating the rotary turntable means.

11. The sound reproducing apparatus set forth in claim 10, wherein said electric circuit means is arranged and disposed to be completely controlled in the full performance of its complete function, solely, by the action provided by said sensing means on it.

12. The sound reproducing apparatus set forth in claim 10, wherein, for said predetermined movement of the pickup arm means, the operating means includes means for, after movement of the pickup arm means has been started, maintaining the movement of the pickup arm means to a predetermined position wherein the stylus is entirely removed from contact with the record and for automatically causing the movement of the pickup arm means to stop when the pickup arm means arrives at said predetermined position wherein the stylus is entirely removed from contact with the record.

13. The sound reproducing apparatus set forth in claim 12, wherein said sensing means includes a photocell means.

14. The sound reproducing apparatus set forth in claim 12, wherein the entire said operating means is so disposed in relation to the pickup arm means that it is in its entirety maintained in a location entirely in spaced relationship to the pickup arm means during substantially all the time the stylus is in contact with, and is being moved by, the record groove in the playing of a record until the stylus is being removed from contact with the record by the operating means.

15. The sound reproducing apparatus set forth in claim 10, wherein, for said predetermined movement of the pickup arm means, the operating means includes means for, after movement of the pickup arm means has been started, maintaining the movement of the pickup arm means to a position wherein the stylus is entirely removed from contact with, and the pickup arm means is laterally removed from above, the record and for then continuing maintaining of movement of the pickup arm means on to play-starting position at the start of a record.

16. The sound reproducing apparatus set forth in claim 15, wherein said sensing means includes a photocell means.

17. The sound reproducing apparatus set forth in claim 15, wherein the entire said operating means is so disposed in relation to the pickup arm means that it is in its entirety maintained in a location entirely in spaced relationship to the pickup arm means during substantially all the time the stylus is in contact with, and is being moved by, the record groove in the playing of a record until the stylus is being removed from contact with the record by the operating means.

18. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; a motor means for acting on the pickup arm means to provide a predetermined movement of the pickup arm means; a maintaining means which is connected to and moved by said motor means; a sensing means, the sensing means and the maintaining means being so disposed in relation to each other that the sensing means is operable to sense a predetermined movement of the maintaining means relative to it, and while the maintaining means is also entirely in spaced relationship to the sensing means; an electric circuit means; said motor means and said sensing means being connected in said electric circuit means, said sensing means being so disposed, and so connected, in said electric circuit means that it forms a mechanically fixed electrical connection in said electric circuit means, and said motor means being energized, through said circuit means, during all the time said sensing means is in operation; initiating means for initiating energization of the motor means, to thereby initiate movement of said maintaining means relative to said sensing means; the sensing means and the maintaining means being, also, so disposed in relation to each other that, upon the initiating means being operated for resultant energization of the motor means to initiate movement of the maintaining means relative to the sensing means, the sensing means then senses, and is also thereby operated by, the movement of the maintaining means relative to it, throughout substantially an entire predetermined movement of the maintaining means to, through said electric circuit means, thereby maintain energization of the motor means, also throughout substantially said entire predetermined movement of the maintaining means; and said initiating and maintaining of the energization of the motor means causing the motor means to act on, and provide said predetermined movement of, the pickup arm means.

19. The sound reproducing apparatus set forth in claim 18, wherein the sensing means includes a photocell and a light means with its light beam directed to impinge on the photocell, and wherein interception of said light beam operates the sensing means and, through said electric circuit means, energizes said motor means during all the time the light beam is being intercepted; and wherein said maintaining means includes a maintaining mask means connected to said motor means, which maintaining mask means is moved by said motor means during all the time said motor means is energized, and which maintaining mask means is, also, so disposed in relation to said light beam, that by its movement relative to said light beam, upon initiating energization of the motor means by said means for initiating energization of the motor means, the maintaining mask means intercepts the light beam substantially throughout a predetermined movement of the maintaining mask means, said interception of the light beam functioning to operate the sensing means to, through said electric circuit means, maintain energization of said initiated energization of the motor means substantially throughout said predetermined movement of the maintaining mask means; and said initiating and maintaining of the energization of the motor means causing the motor means to act on, and provide said predetermined movement of, the pickup arm means.

20. The sound reproducing apparatus set forth in claim 19, wherein said means for initiating energization of said motor means includes a manually operable mask means, which manually operable mask means is so disposed relative to said light beam that, upon being manually actuated, it initiates interception of said light beam to initiate operation of the sensing means to thereby, through said electric circuit means, cause said initiating of energization of the motor means.

21. The sound reproducing apparatus set forth in claim 19, wherein said means for initiating energization of said motor means is a masking means included in the pickup arm means which masking means moves laterally with the pickup arm means during the playing of a record on the turntable, which masking means is so disposed relative to said light beam that by only the movement of the masking means which is provided by only the movement of said pickup arm means which is created solely by the portion of the record groove substantially after the playing of the final recorded sound said masking means intercepts said light beam to initiate operation of the sensing means to thereby, through said electric circuit means, cause said initiating of energization of the motor means.

22. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the stylus is in a portion of record groove substantially after the playing of the final recorded sound to provide a predetermined movement of the pickup arm means, and control means included in said operating means for maintaining the movement of the pickup arm means after it has been started; said operating means including mechanically fabricated structure, the entire mechanicaly fabricated structure of said operating means being so disposed relative to the pickup arm means that it is in its entirety maintained in a location entirely in spaced relationship to the pickup arm means during substantially all the time the stylus is in contact with, and is being moved by, the record groove in the playing of the record until the stylus is being removed from contact with the record by the operating means; said operating means also including a sensing means for sensing a movement of the pickup arm means and connection means to so connect said sensing means to the operating means that said operating means acts on said pickup arm means to provide movement of the pickup arm means in response to said sensing by the sensing means; said pickup arm means including a cooperative means which moves laterally with the pickup arm means during the playing of a record on the turntable means; said sensing means being so disposed in relation to said cooperative means that said sensing means senses, and is also thereby operated by, only the relative movement of said cooperative means with respect to said sensing means which is provided by only the movement of said pickup arm means which is created solely by the portion of the record groove substantially after the playing of the final recorded sound; said sensing means being operable while both said connection means and said sensing means are so disposed in relation to said pickup arm means that both said connection means and said sensing means exert zero value of lateral force on all the lateral movement of the pickup arm means which is created by the record groove during all the time the stylus is in contact with the record groove in the playing of a record until the stylus is being lifted from contact with the record by the operating means; such sensing by the sensing means and said resultant operation of the sensing means, through said connection means, causing operation of said operating means to provide said predetermined movement of the pickup arm means.

23. The sound reproducing apparatus set forth in claim 22, wherein a manually operable means is included in said operating means, said operating means being so related to said manually operable means, when the pickup arm means is in a predetermined position in which the stylus is stationary and is entirely removed from contact with the record, that said manually operable means is then manually operable to cause operation of the operating means, said operating means being then so disposed relative to the pickup arm means that by such operation of the operating means said operating means acts on said pickup arm means to provide movement of the pickup arm means to a position wherein the stylus is placed in contact with the record in play-starting position at the start of the record, and said operating means then continues its movement to a position wherein its entire mechanically fabricated structure is in its entirety located entirely in spaced relationship to said pickup arm means; and stopping means included in said operating means which causes the movement of said operating means to automatically stop when the entire mechanically fabricated structure of the operating means is in the said last position wherein it is in its entirety located entirely in spaced relationship to said pickup arm means.

24. The sound reproducing apparatus set forth in claim 23, wherein said operating means further includes preselectable means for predetermining the amount of said movement of the pickup arm means from said predetermined position wherein the stylus is stationary and is entirely removed from contact with the record to play-starting position at the start of records of different preselected diameters, the entire mechanically fabricated structure of said operating means being still so disposed relative to the pickup arm means that it is in its entirety maintained in a location entirely in spaced relationship to the pickup arm means during substantially all the time the stylus is in contact with the record groove in the playing of a record.

25. The sound reproducing apparatus set forth in claim 23, wherein said operating means is also so related to said manually operable means, during record playing, that said manually operable means is then manually operable to cause operation of the operating means, said operating means being so disposed relative to the pickup arm means that by such operation of the operating means said operating means moves into contact with said pickup arm means from a position wherein its entire mechanically fabricated structure is in its entirety located entirely in spaced relationship to said pickup arm means and said operating means then acts on said pickup arm means and provides a predetermined movement of the pickup arm means.

26. The sound reproducing apparatus set forth in claim 23, wherein the pickup arm means includes a pickup arm, a vertical fulcrum shaft being so connected to the pickup arm that the pickup arm moves laterally with rotation of the shaft, said operating means including a lift lever means, a rotary shaft, and a cam mounted on the rotary shaft in coacting relation with said lift lever means, said lift lever means moving into contact with said pickup arm from a position wherein said lift lever means is entirely in spaced relationship to the pickup arm to then raise and lower the pickup arm; wherein the pickup arm means further includes a projection extending from the vertical fulcrum shaft, and wherein the operating means further includes a second cam on the rotary shaft disposed to move into contact with said projection of the vertical fulcrum shaft from a position wherein said second cam is entirely in spaced relationship to said projection from the vertical fulcrum shaft to rotate the fulcrum shaft and thereby move the pickup arm laterally, while the stylus of the arm is maintained elevated above the record, from a position wherein the stylus is laterally clear of the record to a position wherein the stylus of the arm is elevated directly above play-starting position at the start of the record; and wherein the pickup arm means further includes another projection extending from the vertical fulcrum shaft, and wherein the operating means further includes another cam on the rotary shaft disposed to move into contact with the last mentioned projection extending from the vertical fulcrum shaft from a position wherein said last mentioned cam is entirely in spaced relationship to the last mentioned projection extending from the vertical fulcrum shaft to move the pickup arm laterally, while the stylus of the arm is maintained elevated above the record, back to the position wherein the stylus is laterally clear of the record after the playing of the final recorded sound; both projections of the pickup arm means being so disposed that they are maintained entirely in spaced relationship to the corresponding cams, as well as the pickup arm being also so disposed that it is maintained entirely in spaced relationship to the lift lever means, within substantially the time from when the stylus has been lowered into contact with the record into play-starting position at the start of the record and the record groove is moving the pickup arm means, until the time when the stylus is being lifted from contact with the record after the playing of the final recorded sound.

27. The sound reproducing apparatus set forth in claim 26, wherein for playing records of different preselected diameters, said second cam is shiftable axially along the rotary shaft, to predetermined positions relative to the shaft, to vary the amount of lateral movement the second cam imparts to the corresponding projection extending from the vertical fulcrum shaft of the pickup arm means and, in turn, to vary the amount of the lateral movement said second cam imparts to the pickup arm, for thereby imparting the respective correct predetermined amount of lateral movement for moving the pickup arm laterally from a predetermined position wherein its stylus is entirely removed from contact with, and its stylus is also laterally clear from above, the record on the turntable means, to a position wherein its stylus is directly above play-starting position, at the start of the record of the respective diameter preselected to be played; said axially shiftable second cam being so disposed that it is still maintained entirely in spaced relationship to the corresponding projection extending from the vertical fulcrum shaft of the pickup arm means, for each record of the respective diameter preselected to be played, within substantially the time from when the stylus has been lowered into contact with the record in play-starting position at the start of the record and the record groove is moving the pickup arm means, until the time when the stylus is being lifted from contact with the record after the playing of the final recorded sound.

28. The sound reproducing apparatus set forth in claim 27, wherein the combination further includes a rotary turntable means, a center post about which the turntable means rotates, said post being provided with an offset shoulder adjacent the top for supporting a pile of unplayed records, a shelf means for marginally sustaining the lowermost record in the pile from beneath and provided with an upstanding projection for engaging the outer edge of the lowermost record in the pile, the shelf means including a vertically arranged support means atop of which the shelf means is supported with capacity for rotative adjustment to present ledges and upstanding projections at different radial distances from the axis of the support means in accordance with the diameters of the records to be played; the shelf means and said second cam being connected by a link means by which link means the second cam is axially shifted along the rotary shaft as the shelf means is adjusted for the radial distance of its ledges from the axis of the support means for the record of the diameter preselected to be played, to thereby, at the same time, also vary the amount of lateral movement the second cam imparts to the corresponding projection extending from the vertical fulcrum shaft of the pickup arm means and, in turn, to vary the amount of the lateral movement said second cam imparts to the pickup arm, for thereby imparting the respective correct predetermined amount of lateral movement for moving the pickup arm laterally from a predetermined position wherein the stylus of the pickup arm is entirely removed from contact with, and the pickup arm is also laterally clear from above, the record, to a position wherein the stylus of the pickup arm is directly above play-starting position, at the start of the record of the respective diameter preselected to be played; said axially shiftable second cam being so disposed that it is still maintained entirely in spaced relationship to the corresponding projection extending from the vertical fulcrum shaft of the pickup arm means, for each record of the respective diameter preselected to be played, within substantially the time from when the stylus has been lowered into contact with the record in play-starting position at the start of the record and the record groove is moving the pickup arm means, until the time when the stylus is being lifted from contact with the record after the playing of the final recorded sound.

29. The sound reproducing apparatus set forth in claim 28, wherein the combination still further includes another cam on the rotary shaft which cam, by direct contact with a part of the vertically arranged support means as the rotary shaft is rotated, advances the lowermost record of the pile to lower onto the turntable, prior to movement of the pickup arm means from the predetermined position wherein the stylus of the pickup arm is entirely removed from contact with, and the pickup arm is laterally clear of, the record, to play-starting position at the start of the record, at the beginning of a record changing cycle.

30. The sound reproducing apparatus set forth in claim 29, wherein said operating means further includes a control motor means connected to the operating means for driving the operating means, and wherein the entire said control motor means and the entire said operating means is each so related to both the rotary turntable means and the turntable motor means for rotating the rotary turntable means that the entire said control motor means and the entire said operating means is each operable completely in the full performance of its said function while being, at all times, disposed entirely in spaced relationship to both the rotary turntable means and the turntable motor means for rotating the rotary turntable means.

31. The sound reproducing apparatus set for in claim 23, wherein said operating means further includes a control motor means connected to the operating means for driving the operating means, and wherein the entire said control motor means and the entire said operating means is each so related to both the rotary turntable means and the turntable motor means for rotating the rotary turntable means that the entire said control motor means and the entire said operating means is each operable completely in the full performance of its said function while being, at all times, disposed entirely in spaced relationship to both the rotary turntable means and the turntable motor means for rotating the rotary turntable means.

32. In sound reproducing apparatus, in combination: a pickup arm means for a sound pickup means having a stylus, for use with a rotary turntable means having a turntable motor means for rotating the rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means; said operating means including mechanically fabricated structure means for supporting the pickup arm means in a predetermined position in which the stylus is stationary and is entirely removed from contact with the record and for acting on said pickup arm means when the pickup arm means is in said predetermined position in which the stylus is stationary and is entirely removed from contact with the record to provide movement of the pickup arm means to a position in which the stylus is in contact with the record in play-starting position at the start of the record; said operating means being so disposed relative to said pickup arm means that said entire mechanically fabricated structure means of the operating means is, in its entirety, maintained in a location entirely in spaced relationship to the pickup arm means during all the time the stylus is in contact with, and is being moved by, the record groove in the playing of a record; a manually operable means included in said operating means, said operating means being so related to said manually operable means, when the pickup arm means is in said predetermined position wherein the stylus is stationary and is entirely removed from contact with the record, that said manually operable means is manually operable to cause such operation of said operating means that said mechanically fabricated structure means of the operating means acts on said pickup arm means to provide movement of the pickup arm means to said position wherein the stylus is placed in contact with the record in play-starting position at the start of the record, and said operating means then continues its movement to said position wherein its said entire mechanically fabricated structure means is, in its entirety, located entirely in spaced relationship to said pickup arm means; stopping means included in said operating means which causes the movement of the operating means to automatically stop when the operating means arrives at the said last position wherein its said entire mechanically fabricated structure means is, in its entirety, located entirely in spaced relationship to the pickup arm means; and a control motor means connected to the operating means for driving the operating means, and wherein the entire said control motor means and the entire said operating means is each so related to both the rotary turntable means and the turntable motor means for rotating the rotary turntable means that the entire said control motor means and the entire said operating means is each operable completely in the full performance of its said function while being, at all times, disposed entirely in spaced relationship to both the rotary turntable means and the turntable motor means for rotating the rotary turntable means.

33. The sound reproducing apparatus set forth in claim 32, wherein said operating means further includes preselectable means for predetermining the amount of said movement of the pickup arm means from said predetermined position wherein the stylus is stationary and is entirely removed from contact with the record to play-starting position at the start of records of different preselected diameters, said entire mechanically fabricated structure means of said operating means being still so disposed relative to the pickup arm means that it is, in its entirety, maintained in a location entirely in spaced relationship to the pickup arm means during all the time the stylus is in contact with, and is being moved by, the record groove in the playing of a record.

34. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the stylus is in a portion of the record groove substantially after the playing of the final recorded sound to provide movement of the pickup arm means to a predetermined position in which the stylus is entirely removed from contact with the record, and means included in said operating means for maintaining the movement of the pickup arm means after it has been started and for automatically causing the movement of the pickup arm means to stop when the pickup arm means arrives at said predetermined position wherein the stylus is entirely removed from contact with the record; a photoelectric sensing means being so disposed in relation to said pickup arm means that the photoelectric sensing means senses, and is also thereby operated by, only the movement of the pickup arm means which is created solely by the portion of the record groove substantially after the playing of the final recorded sound; said photoelectric sensing means including a photocell means and a light source means having a light beam, said photoelectric sensing means being operable completely in the full performance of said function while said light beam is being at all times disposed entirely in spaced relationship to the record on the rotary turntable means; a connection means which so connects the photoelectric sensing means to said operating means that said operating means acts on said pickup arm means to provide movement of the pickup arm means in response to said sensing by the photoelectric sensing means; such sensing by the photoelectric sensing means, through said connection means, causing operation of said operating means to move the pickup arm means to said predetermined position wherein the stylus is entirely removed from contact with the record, and, by said means included in said operating means, the movement of said pickup arm means to be automatically stopped when the pickup arm means arrives in said predetermined position wherein the stylus is entirely removed from contact with the record.

35. The sound reproducing apparatus set forth in claim 34, wherein said light beam is disposed to be controlled, solely, by only the movement of the pickup arm means which is created solely by the portion of the record groove at the playing of the final recorded sound.

36. In sound reproducing apparatus, in combination: a pickup arm means for a sound pickup means having a stylus, for using with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the stylus is in a portion of the record groove substantially after the playing of the final recorded sound to provided movement of the pickup arm means to a predetermined position in which the stylus in entirely removed from contact with, and the pickup arm means is laterally removed from above, the record and to then provide movement of the pickup arm means on to play-starting position at the start of a record on the turntable, and means included in said operating means for automatically maintaining said movement of the pickup arm means, after it has been started, to said predetermined position wherein the stylus is entirely removed from contact with, and the pickup arm means is laterally removed from above, the record and then on to play-starting position at the start of a record; a photoelectric sensing means being so disposed in relation to said pickup arm means that the photoelectric sensing means senses, and is also thereby operated by, only the movement of the pickup arm means which is created solely by the portion of the record groove substantially after the playing of the final recorded sound; said photoelectric sensing means including a photocell means and a light source means having a light beam, said photoelectric sensing means being operable completely in the full performance of said function while said light beam is being at all times disposed entirely in spaced relationship to the record on the rotary turntable means; a connection means which so connects the photoelectric sensing means to said operating means that said operating means acts on said pickup arm means to provide movement of the pickup arm means in response to said sensing by the photoelectric sensing means; such sensing by the photoelectric sensing means and said resultant operation of the photoelectric sensing means, through said connection means, causing operation of said operating means to, through said means included in said operating means, automatically move the pickup arm means to said predetermined position wherein the stylus is entirely removed from contact with, and the pickup arm means is laterally removed from above, the record and then on to the play-starting position at the start of a record on the turntable.

37. The sound reproducing apparatus set forth in claim 36, wherein said light beam is disposed to be controlled, solely, by only the movement of the pickup arm means which is created solely by the portion of the record groove at the playing of the final recorded sound.

38. The sound reproducing apparatus set forth in claim 36, further including a rotary turntable means and wherein said operating means further includes a record release means, said record release means being disposed in relation to the rotary turntable means for supporting and for lowering a record to be played onto the rotary turntable means.

39. In sound reproducing apparatus, in combination: a pickup arm means for a sound pickup means having a stylus, for use with a rotary turntable means having a turntable motor means for rotating the rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; and operating means for deenergizing the turntable motor means substantially after the playing of the final recorded sound on the record, said operating means including turntable motor connection means to connect said operating means to the turntable motor means; a photoelectric sensing means being so disposed in relation to said pickup arm means that the photoelectric sensing means senses, and is also thereby operated by, only the movement of the pickup arm means which is created solely by the portion of the record groove substantially after the playing of the final recorded sound; said photoelectric sensing means including a photocell means and a light source means having a light beam, said photoelectric sensing means being operable completely in the full performance of said function while said light beam is being at all times disposed entirely in spaced relationship to the record on the rotary turntable means; a photoelectric sensing connection means which so connects the photoelectric sensing means to said operating means that said operating means, through said turntable motor connection means, causes deenergization of the turntable motor means in response to said sensing by the photoelectric sensing means; such sensing by the photoelectric sensing means and said resultant operation of the photoelectric sensing means, through said photoelectric sensing connection means, causing operation of the operating means to, through said turntable motor connection means, deenergize the turntable motor means and thereby stop rotation of the rotary turntable means.

40. The sound reproducing apparatus set forth in claim 39, wherein said light beam is disposed to be controlled, solely, by only the movement of the pickup arm means which is created solely by the portion of the record groove at the playing of the final recorded sound.

41. In sound reproducing apparatus, in combination: a pickup arm means for a sound pickup means having a stylus, for use with a rotary turntable means having a turntable motor means for rotating the turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the stylus is in a portion of the record groove substantially after the playing of the final recorded sound and providing a predetermined movement of the pickup arm means; a control motor means connected to said operating means for driving the operating means; an electric circuit means; a photoelectric sensing means; said control motor means and said photoelectric sensing means being connected in said electric circuit means, and said control motor means being energized, through said electric circuit means, when said photoelectric sensing means is operated; said photoelectric sensing means being so disposed in relation to said pickup arm means that said photoelectric sensing means senses, and is also thereby operated by, only the movement of the pickup arm means which is created solely by the portion of the record groove substantially after the playing of the final recorded sound; such operation of the photoelectric sensing means, through said electric circuit means, causing operation of the control motor means to drive said operating means to act on said pickup arm means and provide said predetermined movement of the pickup arm means; mounting means positioning and supporting the entire said control motor means, the entire said operating means and the entire said electric circuit means so that all are so positioned and disposed to both the rotary turntable means and the turntable motor means for rotating the rotary turntable means so that the entire said control motor means, the entire said operating means, and the entire said electric circuit means is each operable completely in the full performance of its function while being, at all times, disposed entirely disconnected and in spaced relationship to both the rotary turntable means and the turntable motor means for rotating the rotary turntable means.

42. The sound reproducing apparatus set forth in claim 41, wherein said electric circuit means is arranged and disposed to be completely controlled in the full performance of its complete function, solely, by the action provided by said photoelectric sensing means on it; and wherein the entire said control motor means, the entire said operating means, and the entire said electric circuit means each itself, is so disposed, and each is so disposed with respect to each other, that each is operable completely in the full performance of its function, solely, by their said structural relationship with each other.

43. The sound reproducing apparatus set forth in claim 42, wherein, for said predetermined movement of the pickup arm means, the operating means includes means for, after movement of the pickup arm means has been started, maintaining the movement of the pickup arm means to a predetermined position wherein the stylus is entirely removed from contact with the record and for automatically causing the movement of the pickup arm means to stop when the pickup arm means arrives at said predetermined position wherein the stylus is entirely removed from contact with the record.

44. The sound reproducing apparatus set forth in claim 42, wherein, for said predetermined movement of the pickup arm means, the operating means includes means for, after movement of the pickup arm means has been started, maintaining the movement of the pickup arm means to a position wherein the stylus is entirely removed from contact with, and the pickup arm means is laterally removed from above, the record and for then continuing maintaining of movement of the pickup arm means on to play-starting position at the start of a record.

45. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means when the pickup arm means is in a predetermined position in which the stylus is stationary and is entirely removed from contact with the record to provide movement of the pickup arm means, solely, to a position in which the stylus is in contact with the record in play-starting position at the start of the record, and for also acting on the pickup arm means, when the pickup arm means is in playing position on the record, to provide movement of the pickup arm means back to said predetermined position in which the stylus is stationary and is entirely removed from contact with the record; and means included in said operating means for maintaining the movement of the pickup arm means after it has been started, and for automatically causing the movement of the pickup arm means to stop when the pickup arm means arrives at said predetermined position wherein the stylus is entirely removed from contact with the record; electric means for motivating the operating means for the performance of said function of the operating means; a photoelectric sensing means for controlling the electric means, said photoelectric sensing means including a photocell; electric connection means; the electric connection means connecting the photocell to the electric means, for the electric means to be controlled by the photocell; said electric connection means, at all times, maintaining a fixed electrical connection from said photocell to said electric means; a manually operable means; said operating means being so disposed in relation to said manually operable means that its photoelectric sensing means senses, and is also thereby operated by, movement of the manually operable means; such sensing by the photoelectric sensing means causing operation of said operating means to move the pickup arm means to said position in which the stylus is in contact with the record in play-starting position at the start of the record; said operating means being so disposed in relation to said manually operable means, when the pickup arm means is in playing position on the record, that the photoelectric sensing means senses, and is also thereby operated by, movement of the manually operable means; such sensing by the photoelectric sensing means causing operation of said operating means to move the pickup arm means back to said predetermined position in which the stylus is stationary and is entirely removed from contact with the record, and, by said means included in said operating means, the movement of said pickup arm means to be automatically stopped when the pickup arm means arrives in said predetermined position wherein the stylus is entirely removed from contact with the record.

46. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means, when the stylus is in a portion of the record groove at the playing of the final recorded sound, to provide movement of the pickup arm means to a predetermined position in which the stylus is entirely removed from contact with the record and to then also provide movement of the pickup arm means, solely, to a position in which the stylus is in contact with the record in play-starting position at the start of the record; and means included in said operating means for maintaining the movement of the pickup arm means after it has been started, and for automatically causing the movement of the pickup arm means to stop when the pickup arm means arrives at said predetermined position wherein the stylus is entirely removed from contact with the record; electric means for motivating the operating means for the performance of said function of the operating means; a photoelectric sensing means for controlling the electric means, said photoelectric sensing means including a photocell; electric connection means; the electric connection means connecting the photocell to the electric means for the electric means to be controlled by the photocell; said electric connection means, at all times, maintaining a fixed electrical connection from said photocell to said electric means; said photoelectric sensing means being so disposed in relation to said pickup arm means that the photoelectric sensing means senses, and is also thereby operated by, only the movement of the pickup arm means which is created solely by the portion of the record groove at the playing of the final recorded sound; such sensing by the photoelectric sensing means, through said electric connection means, causing operation of said electric means to motivate the operating means to move the pickup arm means to said predetermined position in which the stylus is entirely removed from contact with the record, and, by said means included in said operating means, the movement of said pickup arm means to be automatically stopped when the pickup arm means arrives in said predetermined position wherein the stylus is entirely removed from contact with the record; a manually operable means, said operating means being so related to said manually operable means, when the pickup arm means is in said predetermined position wherein the stylus is entirely removed from contact with the record, that the manually operable means is then manually operable to cause operation of the operating means; said operating means being then so disposed relative to the pickup arm means that by such operation of the operating means said operating means acts on said pickup arm means to provide movement of the pickup arm means solely to a position wherein the stylus is placed in contact with the record in play-starting position at the start of the record.

47. In sound reproducing apparatus, in combination: a pickup arm means for a sound pickup means having a stylus, for use with a rotary turntable means, which rotary turntable means supports a record for playing; mounting means for so mounting said pickup arm means that the entire said pickup arm means is movable with respect to the mounting means and the stylus is movable laterally and up and down relative to the top surface of the rotary turntable means; an operating means for acting on said pickup arm means, when the stylus is in a portion of the record groove at the playing of the final recorded sound, to provide movement of the pickup arm means to a predetermined position in which the stylus is entirely removed from contact with, and the pickup arm means is laterally removed from above, the record and to then provide movement of the pickup arm means on, solely, to play-starting position at the start of a record on the turntable; and means included in said operating means for automatically maintaining said movement of the pickup arm means, after it has been started, to said predetermined position wherein the stylus is entirely removed from contact with, and the pickup arm means is laterally removed from above, the record and then on to play-starting position at the start of the record; electric means for motivating the operating means for the performance of said function of the operating means; a photoelectric sensing means for controlling the electric means, said photoelectric sensing means including a photocell; electric connection means; the electric connection means connecting the photocell to the electric means for the electric means to be controlled by the photocell; said electric connection means, at all times, maintaining a fixed electrical connection from said photocell to said electric means; said photoelectric sensing means being so disposed in relation to said pickup arm means that the photoelectric sensing means senses, and is also thereby operated by, only the movement of the pickup arm means which is created solely by the portion of the record groove at the playing of the final recorded sound; such sensing by the photoelectric sensing means, through said electric connection means, causing operation of said electric means to motivate the operating means to move the pickup arm means to said predetermined position wherein the stylus is entirely removed from contact with, and the pickup arm means is laterally removed from above, the record and then on solely to play-starting position at the start of the record on the turntable.

References Cited by the Examiner

UNITED STATES PATENTS

| | | | |
|---|---|---|---|
| 2,056,372 | 10/1936 | Schwartz | 274—1 |
| 2,602,668 | 7/1952 | Finneran et al. | 274—15 |
| 2,628,845 | 2/1953 | Dale | 274—23 X |

NORTON ANSHER, *Primary Examiner.*

JOSEPH P. STRIZAK, *Examiner.*